Dec. 17, 1963   L. H. BISHOP ETAL   3,114,543
MACHINE FOR COLLATING, GLUE TIPPING AND CARBON INTERLEAVING
Filed April 13, 1959                         18 Sheets-Sheet 1

INVENTORS.
Lewis H. Bishop
Edvard M. Pedersen
BY
Attorneys

Dec. 17, 1963 L. H. BISHOP ETAL 3,114,543
MACHINE FOR COLLATING, GLUE TIPPING AND CARBON INTERLEAVING
Filed April 13, 1959 18 Sheets-Sheet 2

INVENTOR.
Lewis H. Bishop
Edvard M. Pedersen
BY
Attorneys

Dec. 17, 1963 L. H. BISHOP ETAL 3,114,543
MACHINE FOR COLLATING, GLUE TIPPING AND CARBON INTERLEAVING
Filed April 13, 1959 18 Sheets-Sheet 3

INVENTOR.
Lewis H. Bishop
Edvard M. Pedersen
BY
Attorneys

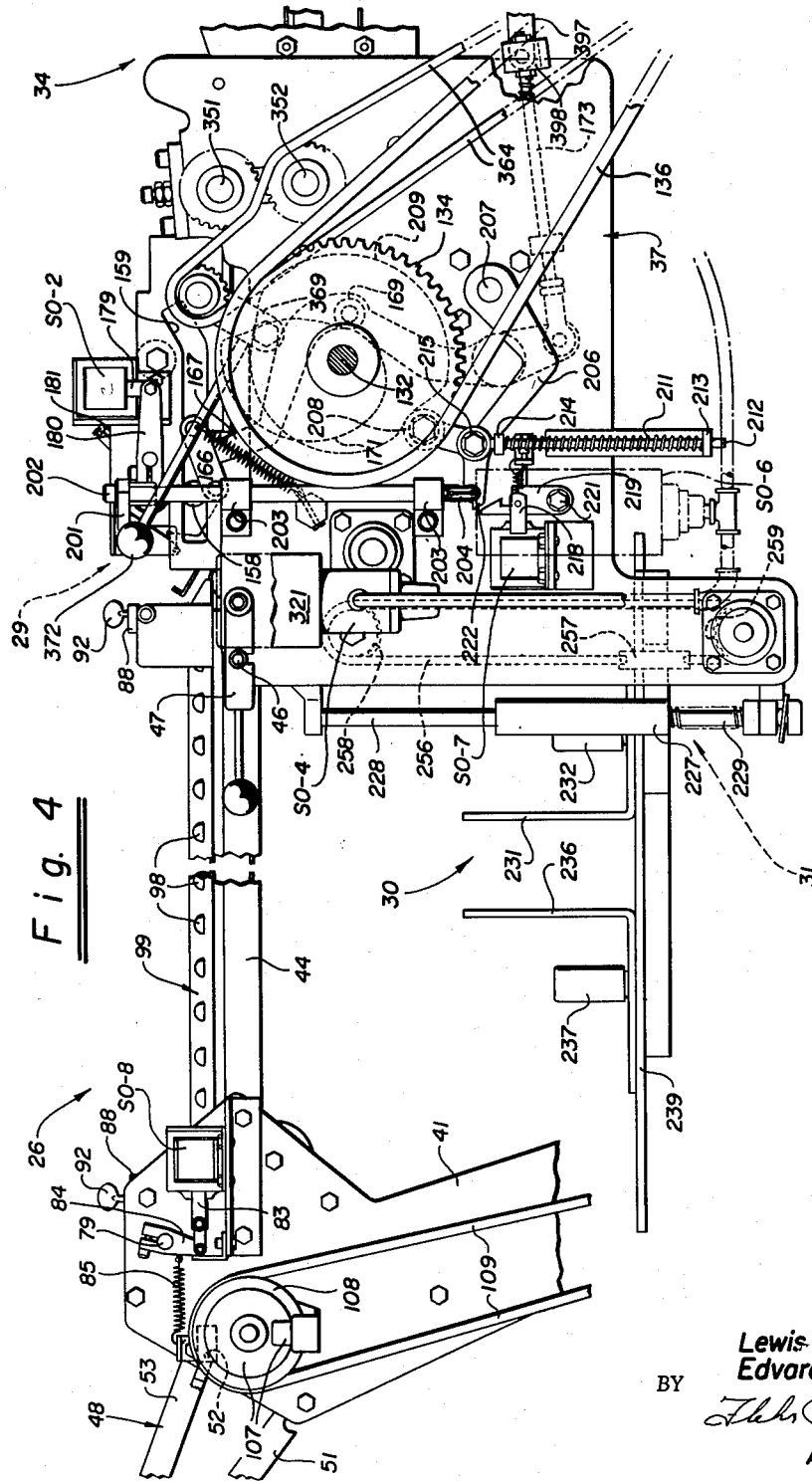

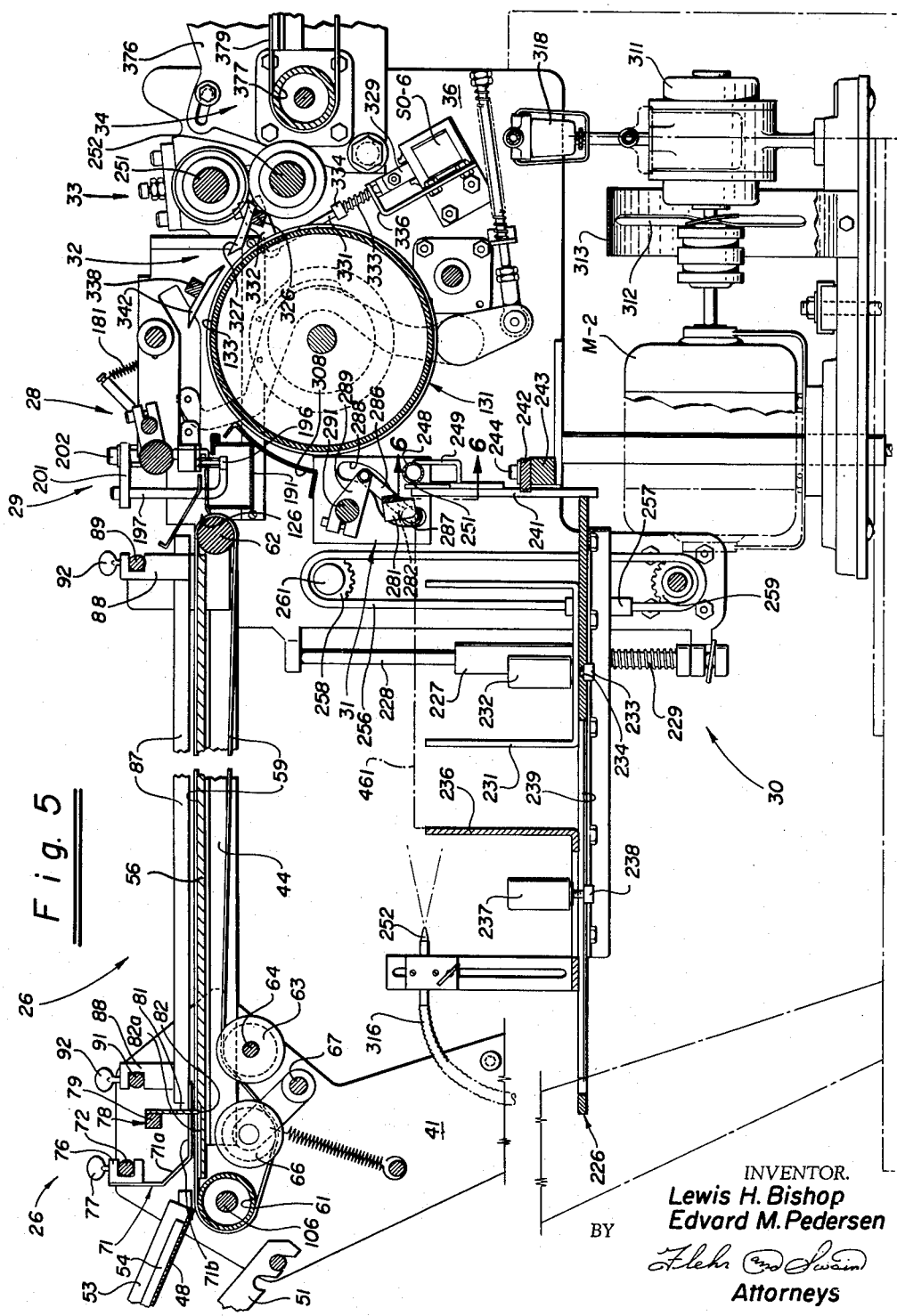

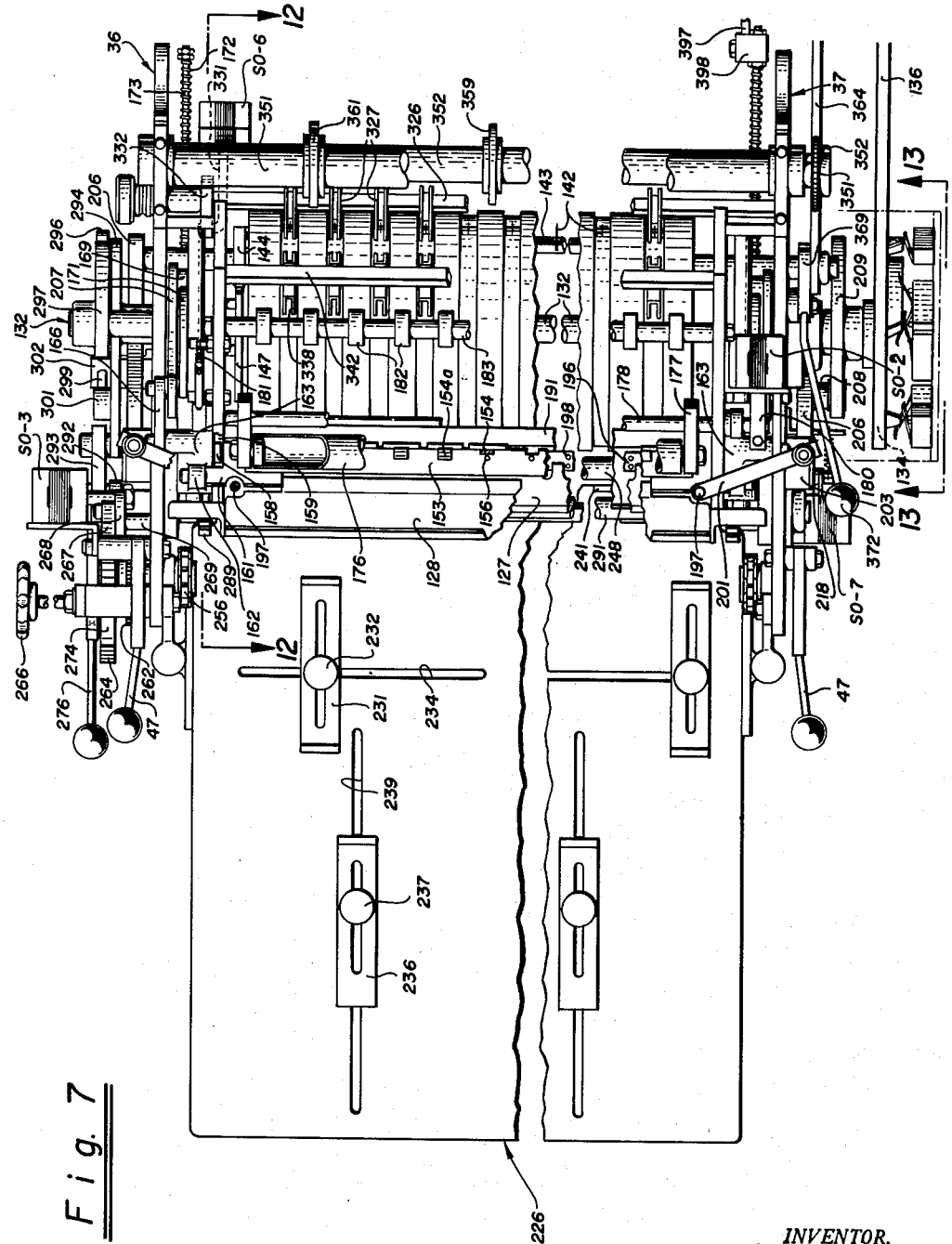

Dec. 17, 1963 L. H. BISHOP ETAL 3,114,543
MACHINE FOR COLLATING, GLUE TIPPING AND CARBON INTERLEAVING
Filed April 13, 1959 18 Sheets-Sheet 7

INVENTOR.
Lewis H. Bishop
Edvard M. Pedersen
BY
Attorneys

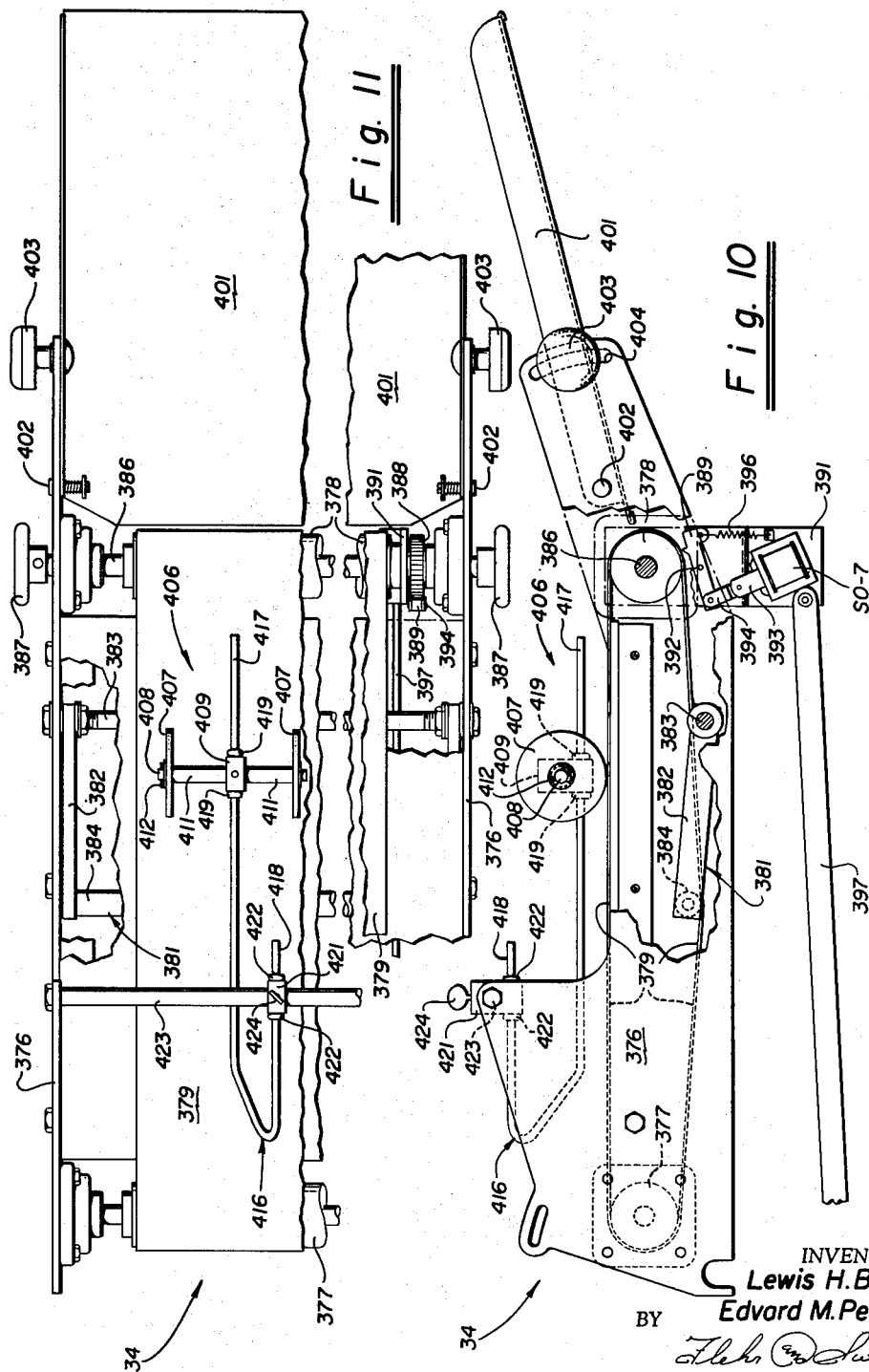

Dec. 17, 1963 L. H. BISHOP ETAL 3,114,543
MACHINE FOR COLLATING, GLUE TIPPING AND CARBON INTERLEAVING
Filed April 13, 1959 18 Sheets-Sheet 9

INVENTOR.
Lewis H. Bishop
Edvard M. Pedersen
BY
Attorneys

INVENTOR.
Lewis H. Bishop
Edvard M. Pedersen
Attorneys

INVENTOR.
Lewis H. Bishop
Edvard M. Pedersen
BY
Attorneys

Dec. 17, 1963   L. H. BISHOP ETAL   3,114,543
MACHINE FOR COLLATING, GLUE TIPPING AND CARBON INTERLEAVING
Filed April 13, 1959   18 Sheets-Sheet 12
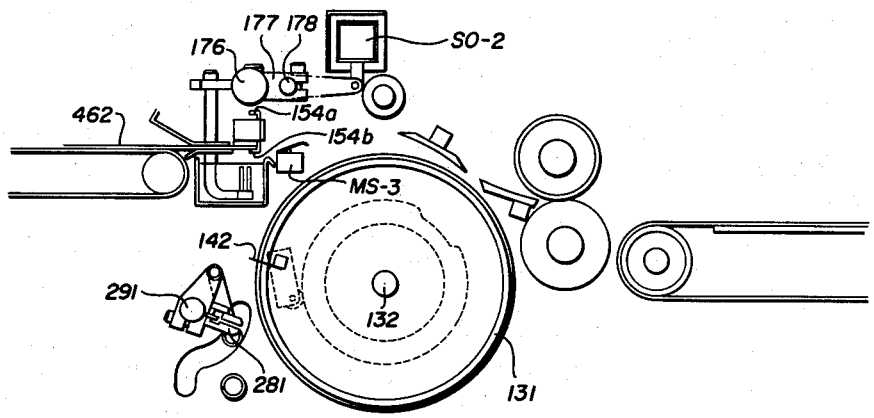
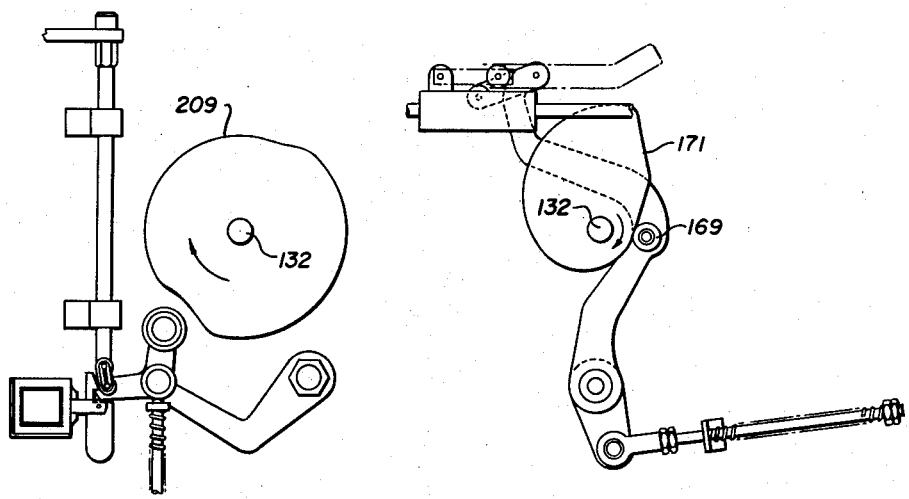
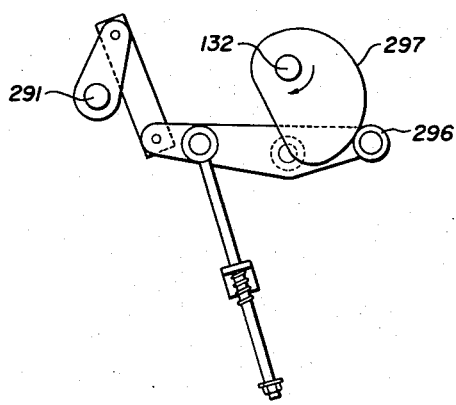
Fig. 18
INVENTOR.
Lewis H. Bishop
Edvard M. Pedersen
BY
Attorneys

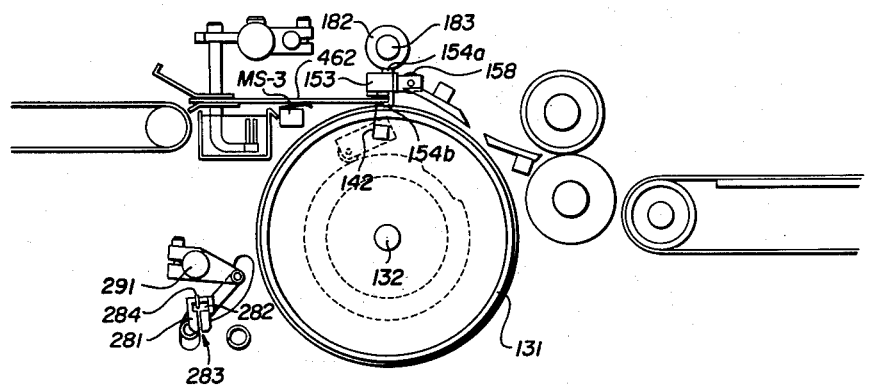
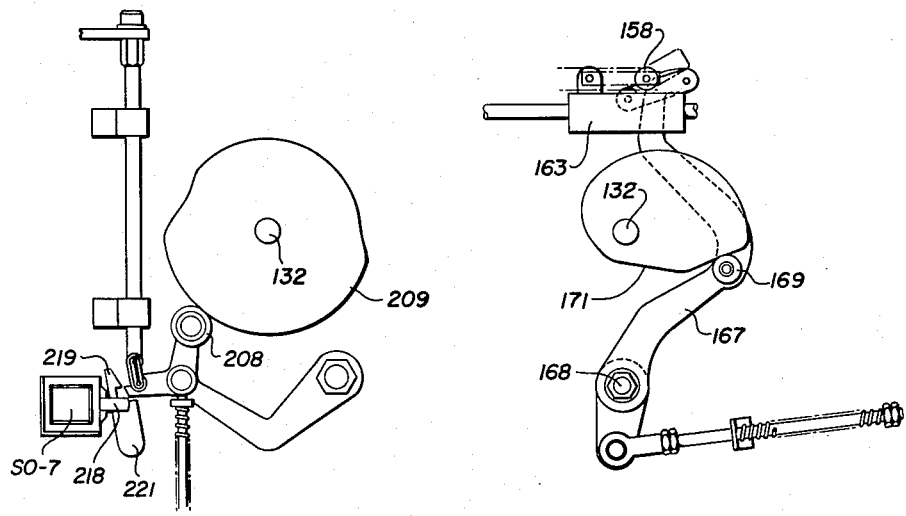
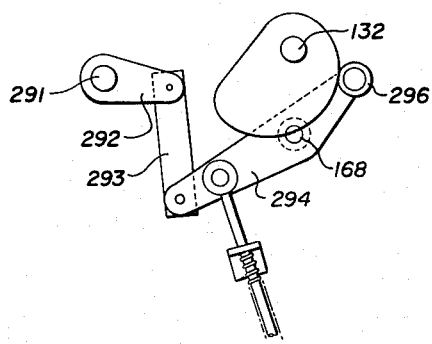
Fig. 19

Dec. 17, 1963   L. H. BISHOP ETAL   3,114,543
MACHINE FOR COLLATING, GLUE TIPPING AND CARBON INTERLEAVING
Filed April 13, 1959   18 Sheets—Sheet 14
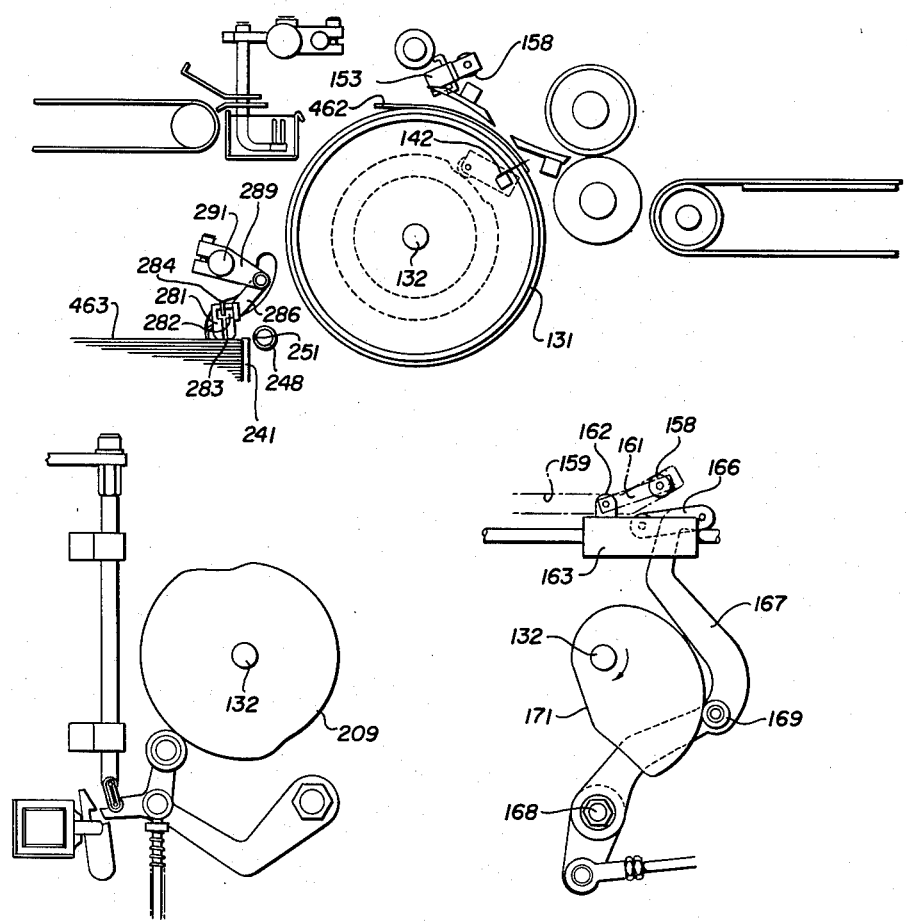
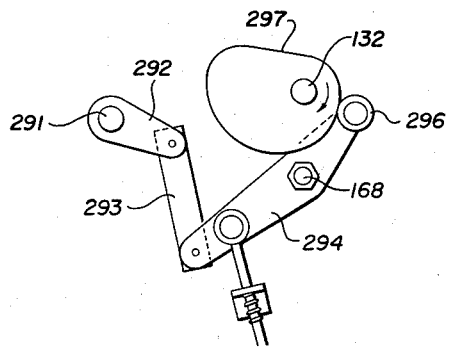
Fig. 20
INVENTOR.
Lewis H. Bishop
Edvard M. Pedersen
BY
Attorneys

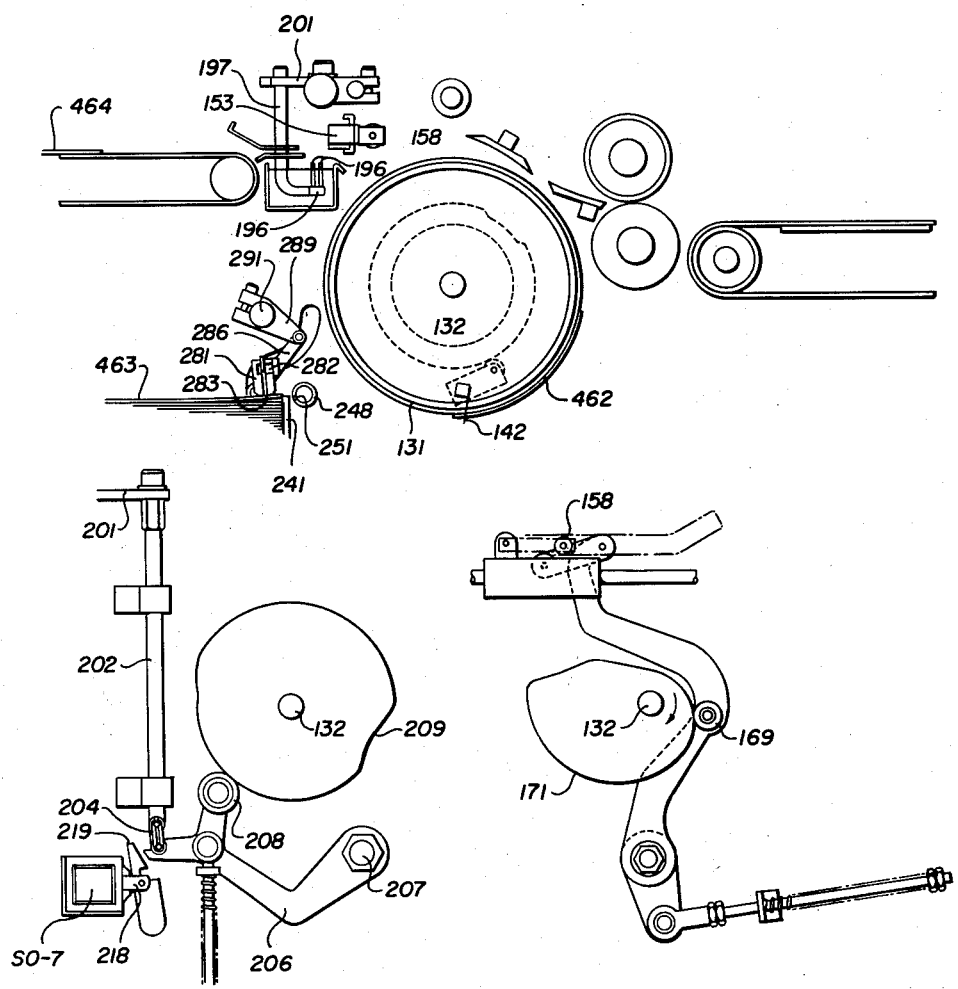
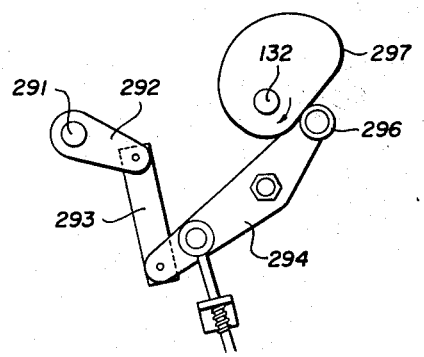
Fig. 21

# United States Patent Office 3,114,543
Patented Dec. 17, 1963

3,114,543
MACHINE FOR COLLATING, GLUE TIPPING
AND CARBON INTERLEAVING
Lewis H. Bishop, Menlo Park, and Edvard M. Pedersen, San Mateo, Calif., assignors to Pierce Specialized Equipment Co., San Mateo, Calif., a corporation of California
Filed Apr. 13, 1959, Ser. No. 806,002
23 Claims. (Cl. 270—58)

This invention relates generally to a machine for collating, glue tipping and carbon interleaving.

A collating machine is disclosed in Patent No. 2,721,-737. When such a machine was placed in commercial operation, it was found to have several undesirable characteristics which hindered production by the machine. By way of example, the feed gate in the above machine was mechanically operated which made it necessary that the sheets be dropped into the hopper of the machine while the gate was closed. If a sheet were dropped into the hopper while the gate was open, a mis-feed or jam-up would occur. The gluing mechanism caused many difficulties in the machine. For example, glue would drip from the glue applicators of the machine onto the forms being prepared by the machine. Other difficulties too numerous to mention were also encountered which made necessary a complete re-design of the machine as hereinafter described.

In general, it is an object of the present invention to provide a machine for collating, glue tipping and carbon interleaving which overcomes the above mentioned disadvantages.

Another object of the invention is to provide a machine of the above character in which glue is not applied to the first sheet of a form picked up by the drum.

Another object of the invention is to provide a machine of the above character in which glue is applied to the underside of the sheets before they are picked up by the drum.

Another object of the invention is to provide a machine of the above character in which glue is indirectly applied to the carbons.

Another object of the invention is to provide a machine of the above character in which the sheets are released by electrically controlled feed gate means at a proper time to ensure arrival at the feed mouth at the proper time.

Another object of the invention is to provide a machine of the above character in which means is provided for positively driving the sheets held by the feed gate means the moment the feed gate means is opened.

Another object of the invention is to provide a machine of the above character in which electrostatic charges gathered by the sheets of paper are dissipated.

Another object of the invention is to provide a machine of the above character in which particularly novel means is used for transferring the sheets from the feed belts to the pickup and collecting drum.

Another object of the invention is to provide a machine of the above character in which means has been provided for detecting when a carbon has not been lifted from the pile of carbons.

Another object of the invention is to provide a machine of the above character in which another sheet cannot be fed into the machine until a carbon has been picked up by the drum.

Another object of the invention is to provide a machine of the above character in which forms with any predetermined number of parts can be perpared with or without carbons.

Another object of the invention is to provide a machine and method of the above character in which the forms are automatically removed or stripped from the drum when completed.

Another object of the invention is to provide a machine of the above character in which the completed forms are readily removed from the pickup and collecting drum without tearing.

Another object of the invention is to provide a machine of the above character in which the carbon table is automatically raised to a position to permit lifting of carbons from the carbon table.

Another object of the invention is to provide a machine of the above character in which the forms can be slitted and trimmed after removal from the sheet collecting drum.

Another object of the invention is to provide delivery means which permits the glue to dry before the forms are handled.

Additional objects and features of the invention will appear from the following description in which the preferred embodiment has been set forth in detail in conjunction with the accompanying drawings.

Referring to the drawings:

FIGURE 4 is a partial enlarged side elevational view of the far side of the machine as viewed in FIGURE 1 with the protective cover removed.

FIGURE 5 is a longitudinal cross-sectional view of the machine taken along the line 5—5 of FIGURE 1.

FIGURE 6 is a partial view of the front guides for the sheets of carbon.

FIGURE 7 is a partial plan view of the machine showing the sheet collecting drum and associated apparatus.

FIGURE 10 is a side elevational view of the delivery table of the machine with certain parts broken away.

FIGURE 11 is a plan view of the delivery table as shown in FIGURE 9 with certain parts broken away.

FIGURE 13 is a cross-sectional view showing the cams for operating the microswitches carried by the switch plate.

FIGURE 14 is a diagram with certain parts schematically illustrated showing the vacuum system for the machine.

FIGURE 16 is an exaggerated illustration of one of the forms completed by the machine.

FIGURES 17–26 illustrate the various parts of the machine in various portions of the cycle of operation of the machine.

*General Description*

Figure 1:
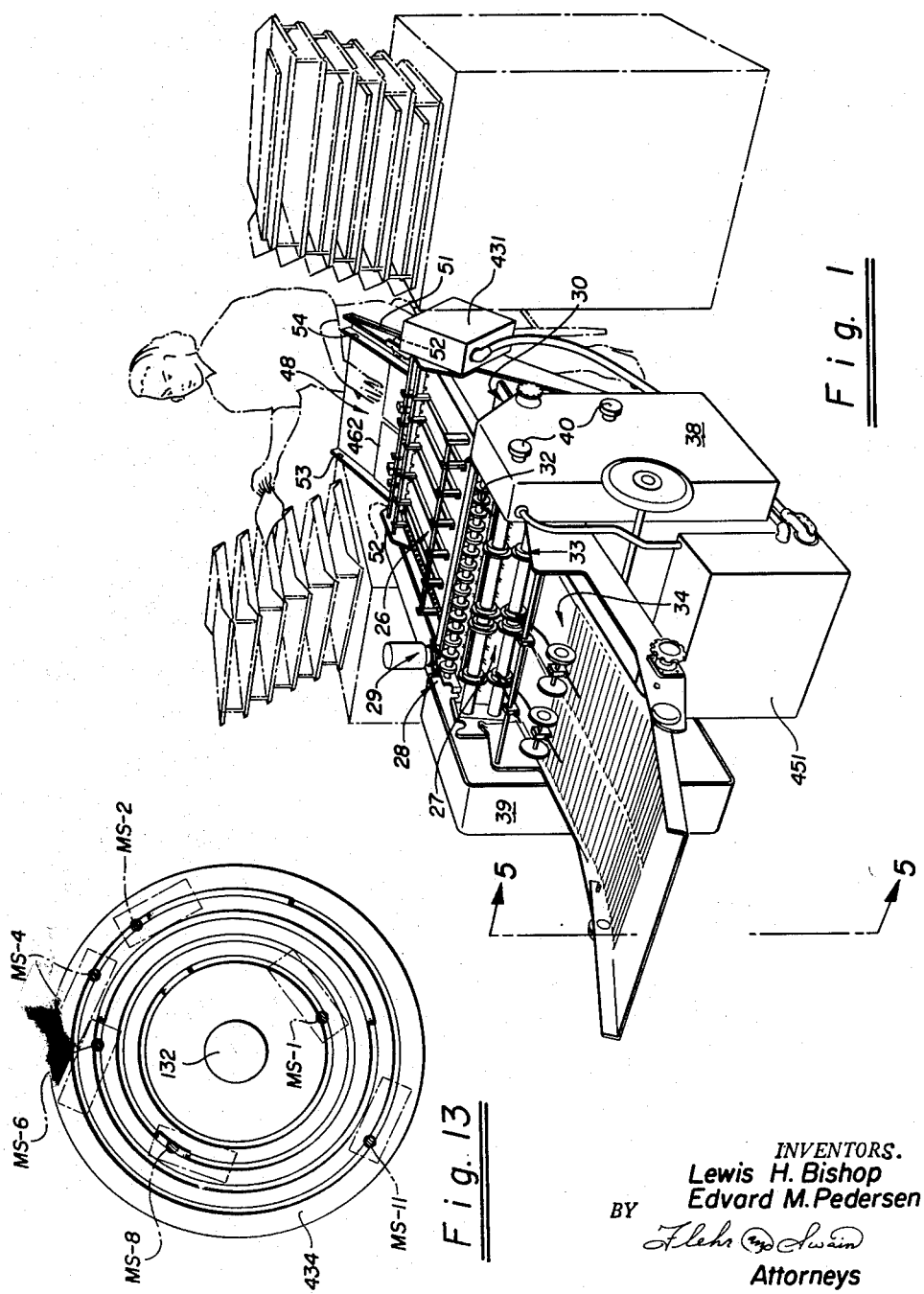
FIGURE 1 is a perspective view of a machine for collating, glue tipping and carbon interleaving incorporating the present invention.
Figure 2:
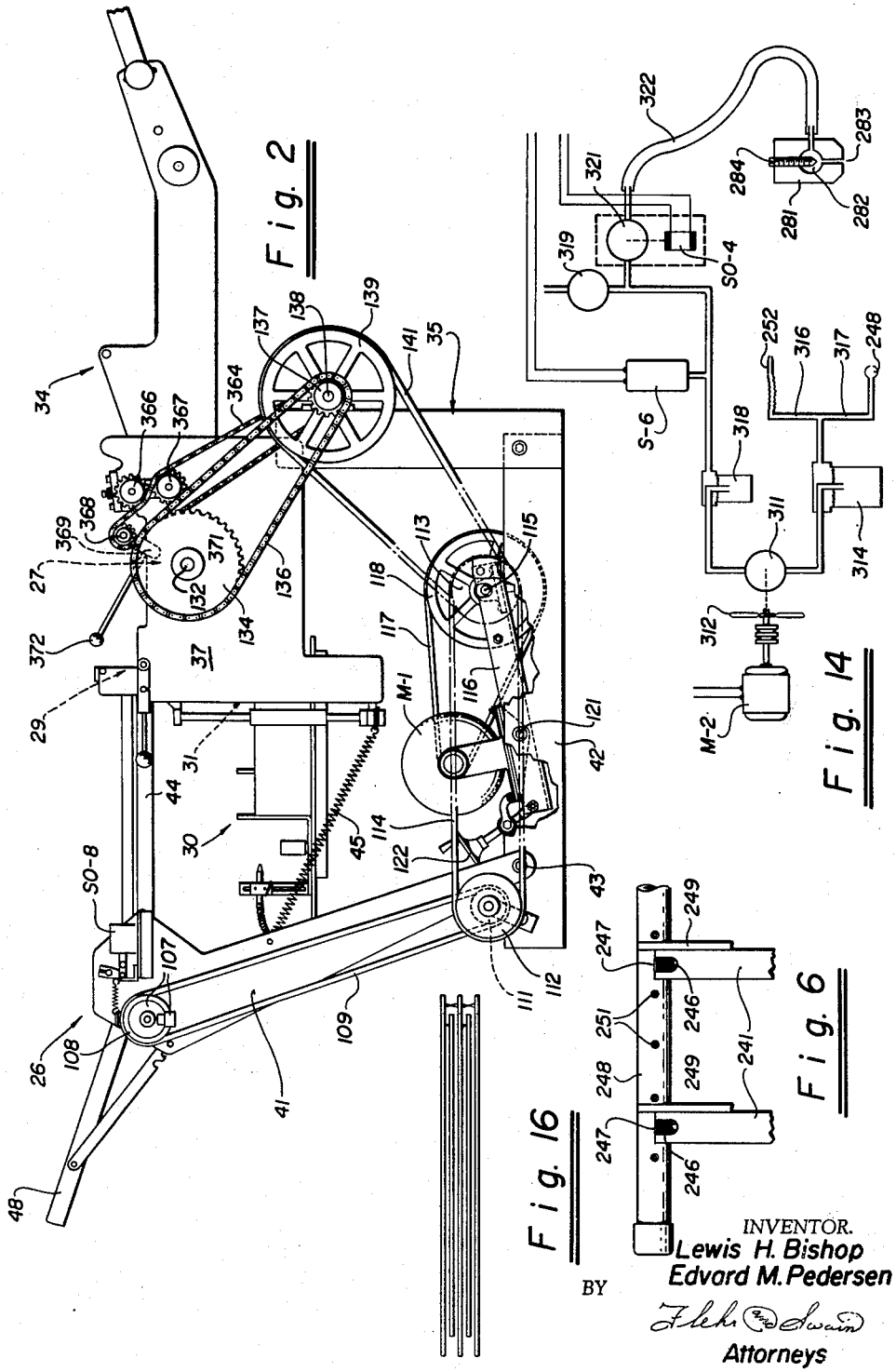
FIGURE 2 is an enlarged side elevational view of the far side as shown in FIGURE 1 with the protective cover removed and with certain parts broken away.

The broad purpose of the machine is to collect a plurality of sheets of paper in a predetermined registered fashion while at the same time gluing the sheets of paper together to form multi-part forms and delivering the completed forms. If desired, the forms can be assembled with or without sheets of carbon interleaved between the sheets of paper. The forms can consist of any number of parts—of one part with one sheet of paper and one sheet of carbon to multi-parts with two or more sheets of paper with or without interleaved sheets of carbon.

In general, the machine includes a hopper into which sheets of paper are manually fed in succession and allowed to drop down to a feed gate on a feed table. At a predetermined time interval, the feed gate is opened to allow feed belt means carried by a feed table to advance a sheet into a feed mouth. A gripper transfer mechanism transfers the sheets from the feed mouth to a sheet collecting or pickup drum at a position tangential to the drum. The collecting drum picks up the forward margin of the sheet. The glue mechanism is controlled so that no glue is applied to this first sheet picked up by the drum.

In a timed relationship with respect to the rotation of the sheet collecting drum, a carbon sheet pick-up and feeding mechanism picks up a sheet of carbon from a stack of carbon sheets and carries the sheet to a position tangential of the drum which is circumferentially spaced from the station at which the sheets of paper are fed to the sheet collecting drum. The sheet collecting drum picks up the forward margin of the carbon sheet.

Thereafter in a timed relationship, another sheet is released by the feed gate and two rows of glue dots are applied to the underside of the foremost margin of the sheet of paper after it has passed through the feed mouth. The sheet of paper is then picked up by the sheet collecting drum and urged into registration with the sheet of paper and the carbon sheet already picked up by the drum so that one row of dots registers with the sheet of paper and the other row of dots registers with the carbon sheet to thereby temporarily bond the sheets together which will become permanently bonded upon drying of the glue. Thereafter, additional carbon sheets and sheets of paper are picked up by the sheet collecting drum until the form has been completed as determined by the automatic control means.

As soon as the multi-part form has been completed as determined by the control means, a stripping mechanism operating in a timed relationship with the drum, strips the completed form from the drum. The completed forms are then trimmed and slitted if desired.

The automatic control system for the machine stops the feed belt means carried by the feed table when no carbon sheet is picked up by the carbon sheet pick-up and feeding mechanism.

*Specific Description*

More in particular, the machine for collating, glue tipping and carbon interleaving includes a paper sheet feed mechanism 26, a sheet collecting drum assembly 27, a gripper transfer mechanism 28, a glue applicator mechanism 29, a carbon sheet table assembly 30, a carbon sheet pick-up and feeding mechanism 31, a stripping mechanism 32, a trimming, slitting and perforating mechanism 33 and a delivery mechanism 34.

The machine also includes a frame 35 of conventional construction which is comprised of a pair of side frame members 36 and 37 which are rigidly connected in a spaced relation by cross members forming component parts of various mechanisms of the machine as hereinafter described. Protective side covers 38 and 38 secured by knobs 40 to the side frame members are provided.

*Paper Sheet Feed Mechanism*

The paper sheet feed mechanism 26 is mounted on one end of the frame 35 and consists of a pair of substantially vertical members 41 which are pivotally connected to the base 42 of the frame by bolts 43 on opposite sides of the base. Substantially horizontal members 44 are fixed to the spaced members 41 and are releasably secured to the side frame members 36 and 37 by means of pins 46 which are secured to the side frame members which are adapted to be releasably engaged by hand operated catches 47 (see FIGURE 4). By lifting the catches 47 upwardly, the paper sheet feed mechanism is released so that it can be tilted forwardly away from the remainder of the machine to permit access to the carbon sheet table as hereinafter described. Springs 45 secured to the frame and the members 41 serve to counterbalance the weight of the feed mechanism when it is tilted.

A feed hopper or tray 48 disposed between the members 41 has its lower end pivotally connected to the vertical members 41. The outer or upper end of the feed hopper 48 is adapted to be tilted to adjust the angle of incline by means of notched bars 51 pivotally connected to the outer end of the tray and adapted to releasably engage pins 52 provided on the frame members 41. The tray or hopper is provided with an upturned edge 53 on its right-hand side to guide sheets of paper fed into the same. A movable guide 54 is provided on the hopper for guiding the left-hand edges of the sheets of paper fed into the hopper.

The hopper 48 is adapted to be used to feed sheets of paper successively onto a substantially horizontal feed table 56. The feed table 56 is preferably formed of a suitable transparent material such as Plexiglas to permit viewing of the operation of the carbon sheet pick-up and feeding mechanism immediately below the table. The Plexiglas is preferably in the form of strips of two different thicknesses which have been cemented together to form the feed table. Alternate strips 57 have an upper surface which is lower than alternate strips or runners 58 for a purpose hereinafter described. A plurality of sheet conveying belts 59 of suitable material such as fabric are disposed laterally of the table 56 and travel along the surfaces of the strips 57. The forward ends of the belts are driven by a roller 61 rotatably carried by the members 41. The rear ends of the belts are supported by a roller 62 rotatably carried in the horizontal members 44. On their return, the belts pass over individual guide rollers 63 rotatably mounted on a rod 64 fixed to the frame members 41. The belts are maintained in a relatively taut condition by individual idler rollers 66 (FIGURES 8 and 9) carried by a rod 67 supported by the members 41.

The raised runner portions 58 are provided so their surfaces are on the same plane as the belts 59 to provide a substantially level surface upon which the sheets of paper can be advanced.

Figure 8:
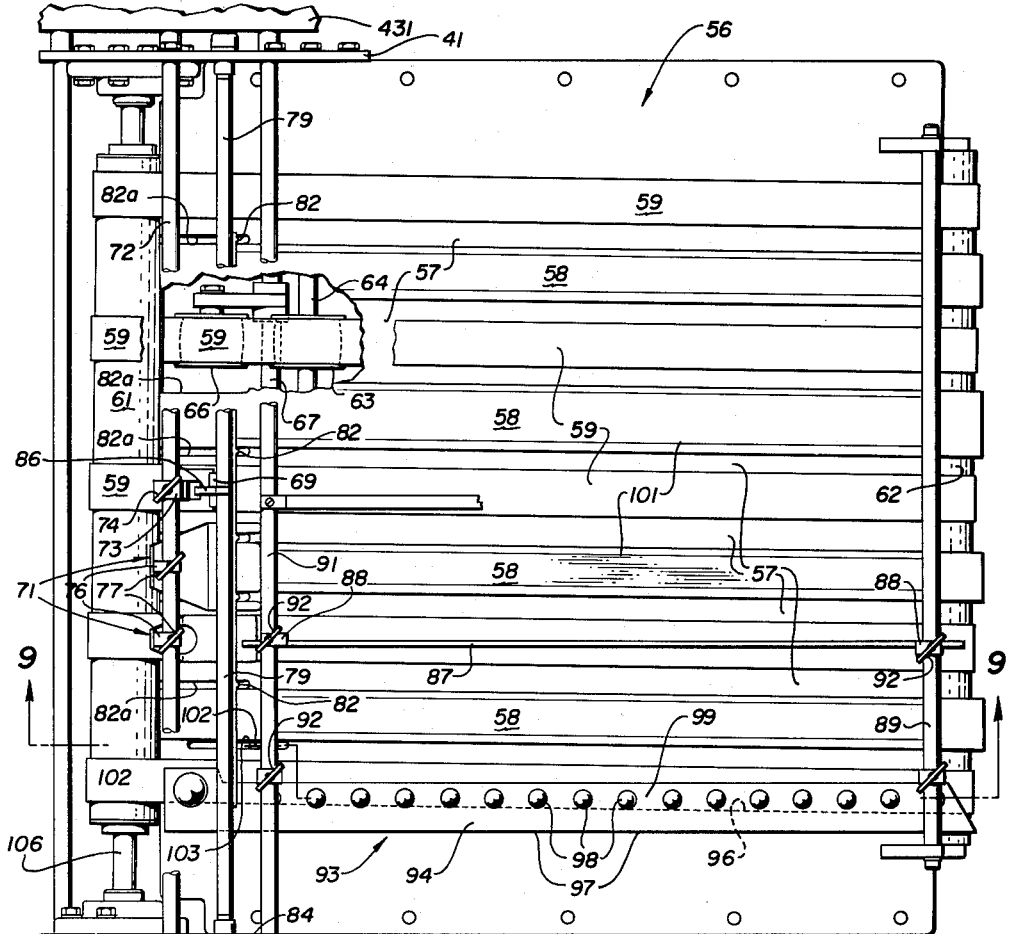
FIGURE 8 is a partial plan view with certain parts broken away of the feed mechanism for the machine.
Figure 9:
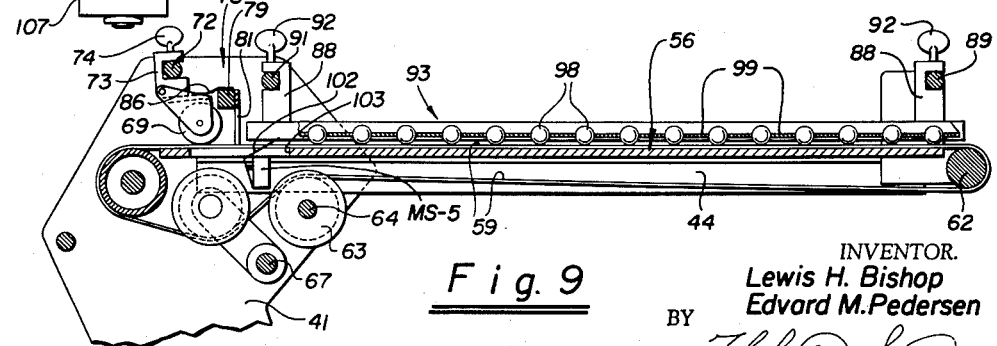
FIGURE 9 is a cross-sectional view taken along the line 9—9 of FIGURE 8.

As is apparent from FIGURE 8, the belts 59 are arranged at a slight angle to the length of the feed table 56 for a purpose hereinafter described, and to so arrange the belts, the rollers 61 and 62 are disposed with their axes normal to the length of the belts 59 and at a slight angle with respect to the longitudinal axis of the machine.

The sheets of paper which are fed successively into the feed hopper 48 are frictionally engaged by the rear ends of the belts 59 as the sheets drop onto the belts from the hopper. They are engaged by feed rollers 69 and shoes 71 carried by a rod 72 supported by the side members 41. The feed rollers are supported by brackets 73 releasably secured to the rod 72 by thumb screws 74 and adapted to be rotated on the rod and slid longitudinally of the rod to the desired positions. The shoes 71 are substantially L shaped in form and are carried by brackets 76 also secured to the rod 72 by thumb screws 77 to permit the shoes to be rotated and shifted longitudinally of the rod 72. The shoes 71 are provided with an inclined rear surface 71b, which as the sheets of paper slide from the hopper serve to guide the leading edge of the sheets downwardly onto the feed belt and below horizontal toe portions 71a of the shoes 71. The shoes 71 also serve to guide the sheets of paper downwardly into engagement with the feed belts and also into engagement with the rollers 69.

The feed belts 59 urge the forward edge of the sheet into engagement with a feed gate 78 at which point the travel of the paper is stopped. Advancement of the sheet of paper to the feed gate causes the sheet of paper to be properly aligned on the feed table so that it is ready to be advanced by the feed belts 59 as hereinafter described.

The feed gate 78 consists of a feed gate bar 79 rotatably mounted in the side members 41. The feed gate bar is provided with a plurality of vertically depending foot-like members 81 disposed longitudinally of the bar 79 and which immediately overlie the feed belts 59. The foot-like members 81 are provided with tines 82 which extend into slots 83 provided in the shoes 71.

The feed gate 78 is movable between open and closed positions. It is moved to an open position by a solenoid SO-8 mounted on one of the members 44. The solenoid SO-8 is provided with a plunger 83 which is pivotally connected to a crank arm 84 secured to the feed gate bar 79. The feed gate is normally held in a closed position by a spring 85 secured to the crank arm. When solenoid SO-8 is energized, the feed gate is swung in a counter-clockwise direction as viewed in FIGURE 5 to rotate the foot-like members out of engagement with the sheet of paper to allow the sheet of paper adjacent the gate to be advanced by the feed belts.

Spring members 86 are carried by the brackets 73 of the feed rollers 69 which are adapted to be engaged by one of the edges of the square feed gate bar 78 so that as the feed gate bar is rotated, the spring members and the brackets 73 and feed rollers 69 carried thereby are urged downwardly upon the sheet of paper to ensure that the sheet of paper will be firmly engaged by the feed belts 59. For this reason the sheet of paper is advanced immediately upon opening of the feed gate.

Hold-down bars 87 are held in spaced relationship above the belts by mounting members 88 releasably secured to rods 89 and 91 by thumb screws 92. The hold-down bars 87 are spaced from the belts a sufficient distance so that they do not interfere with the normal travel of the sheets of paper with the belt. The hold-down bars, however, do prevent curling and buckling of the sheets of paper as they are advanced by the feed belts.

Guide means 93 is mounted on the right-hand side of the feed table 56 and consists of an overhanging guide member 94 secured to the member 44. A thin strip 96 of suitable material such as spring metal is attached to the underside of the guide member 94 at 97 and is adapted to overlie the edge of the sheet of paper engaging the guide member 94 to prevent the side edge of the sheet from riding up into the guide member. This strip is particularly important when very thin sheets of paper are being fed into the feed hopper. Balls 98 in a suitable form such as marbles are disposed adjacent the guide strip 96 and are maintained in a proper spaced relationship by a cage 99 secured to the guide strip. As the edge of the sheet of paper travels along the guide means, the marbles serve to increase the friction between the belt immediately below the sheet of paper to thereby ensure a positive drive for the sheets of paper.

As hereinbefore explained, the belts are slightly inclined at an angle. This angling of the belts is provided so that the sheet of paper as it is advanced is gradually urged to the right and into engagement with the guide strip 96. This ensures that the sheet of paper is always in proper registration and alignment as it travels down the feed table.

Suitable means is provided for dissipating any electrical charges collected by the paper as it travels over the feed table, and as shown can consist of aluminum foil strips 101 fastened to the top sides of the runners 58 and grounded in a suitable manner. Thus, any charges which tend to collect on the paper because of travel over the Plexiglas feed table, are immediately dissipated by the aluminum strips 101.

A microswitch MS-5 is mounted on the feed table and has an operating arm 102 which extends through an opening 103 of the feed table so that it is adapted to be engaged by a sheet of paper as it travels onto the feed table. The purpose of this microswitch is hereinafter described.

The drive roller 61 for the feed belts 59 is mounted on a shaft 106 rotatably mounted in the side members 41. It is adapted to be rotated through an electric clutch 107 driven by a pulley 108. The pulley 108 is driven by a belt 109 disposed on pulley 111. Pulley 111 is driven by pulley 112 which, in turn, is driven by pulley 113 through a belt 114. Pulley 113 is fixed to a shaft 115 rotatably mounted on a base 116 which carries a drive motor M-1. The drive motor M-1 through a belt 117 drives a pulley 118 also secured to the shaft 115. The base 116 is pivotally mounted at 121 on the base 42 of the main framework 35 and is provided with an adjustment wheel 122 for pivoting the base 116 about the pivot point to tighten or loosen the drive belts in a manner well known to those skilled in the art.

*Sheet Collecting or Pickup Drum Assembly*

As a sheet of paper is delivered by the belts 59 from the feed table, it is fed into a feed mouth 126 consisting of a lower straddle plate 127 and an upper plate 128 inclined upwardly and above the feed table (see FIGURE 5). When a sheet of paper passes from the feed mouth 126 it is in a position to be delivered substantially tangentially to the upper portion of a drum 131 which forms a part of the sheet collecting or pick-up drum assembly. The drum 131 has a supporting shaft 132 rotatably mounted in the side frame members 36 and 37 and is provided with regularly spaced annular grooves 133 extending the length thereof for a purpose hereinafter described. The shaft 132 is driven by a main sprocket wheel 134 that is driven by a chain 136. The chain 136 is driven by a sprocket wheel 137 affixed to a shaft 138. The shaft 138 is rotated by a pulley 139 driven by a belt 141 which is driven by the double pulley 113. It therefore, can be seen that the belts 59 are driven in a timed relationship with respect to the drum 131.

Figure 12:
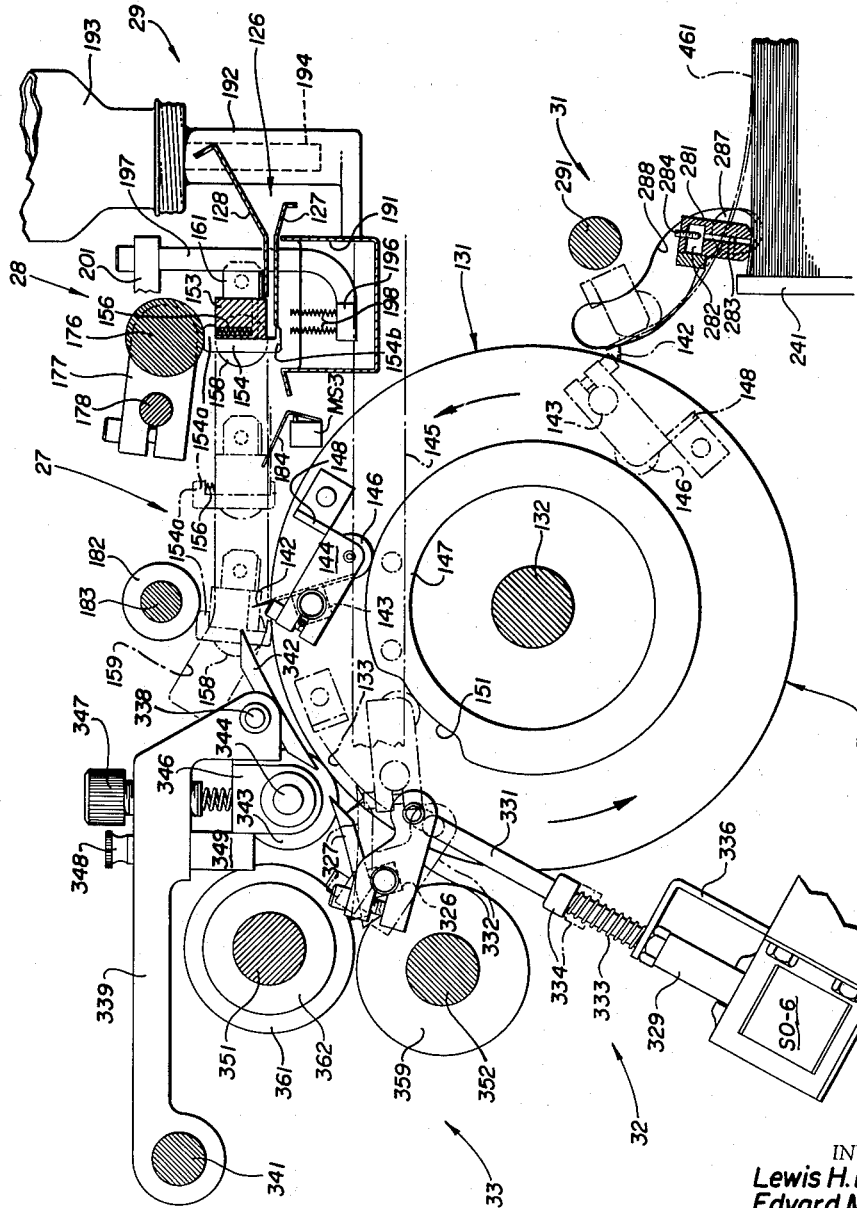
FIGURE 12 is a cross-sectional view taken along the line 12—12 of FIGURE 7.

Drum 131 rotates in a counter-clockwise direction as viewed in FIGURE 12 and carries a single row of laterally spaced paper piercing or impaling sheet pick-up pins 142, the points of which extend beyond the periphery of the drum through slots provided in the drum. The pins 142 are carried by a pin bar 143 rockably mounted within the interior of the drum. Lever arms 144 are provided on each end of the pin bar 143 and carry cam followers 146. The cam followers 146 engage fixed circular cams 147 carried by bars 145. Stops 148 are mounted on opposite ends of the drum and engage the lever arms 144 and serve to maintain the cam followers 146 in engagement with the cams 147 to thereby maintain the paper pick-up pins 142 in a forwardly inclined position so that they can more readily pick up and retain the sheets as they are presented to the drum. Each of the cams 147 is provided with a recess 151 to permit the cam follower to drop away from the cam stop 148 to thereby permit rocking or tilting of the pins rearwardly to facilitate the stripping of accumulated sheets of paper from the drum as hereinafter described.

It therefore, can be seen that as the drum 131 is rotated, the paper impaling pins 142 will be maintained in the forwardly inclined position through the paper sheet pick-up position and also through the carbon sheet pick-up position as hereinafter described and will only be allowed to tilt rearwardly through a very small portion of the cycle of rotation.

*Gripper Transfer Mechanism*

The gripper transfer mechanism which is used for transferring the sheets of paper from the feed mouth to the paper sheet pick-up position consists of a laterally disposed gripper bar 153 that carries a plurality of spaced vertically movable grippers 154. The grippers as can be seen in FIGURE 12, are substantially U shaped and are provided with head and toe portions 154a and 154b.

The grippers 154 are normally urged in an upward direction by springs 156 carried by the gripper bar and engaging the head portion 154a of the grippers.

The transfer gripper bar is movable between sheet gripping and sheet releasing positions. The ends of the bar are provided with rollers 158 which ride in guide slots 159 provided in the side frame members 36 and 37. It will be noted that the rearward ends of the slots 159 are inclined upwardly for a purpose hereinafter described. The ends of the transfer gripper bar 153 are also pivotally connected to links 161 which are, in turn, pivotally connected to ears 162 provided on slide bearings 163 (see FIGURE 13) slidably mounted on guide rods 164 for rectilinear movement. The slide bearings 163 are also pivotally connected to links 166 that are pivotally connected to cam follower arms 167 on opposite sides of the frame. The cam follower arms 167 are pivotally mounted on the pins 168 provided on the side frame members 36 and 37. A cam follower 169 is carried by each of the arms 167 and is adapted to be urged into engagement with a cam 171 affixed on the shaft 132 for rotation with the shaft. The cam followers 169 are yieldably urged into engagement with the cams 171 by springs 172 mounted on rods 173 pivotally connected to the cam follower arms 167 and passing through spring stops 174. Thus, it can be seen that the transfer gripper bar is normally urged towards the paper gripping position by the springs 172 and is moved to the paper releasing position by the action of the cams 171 on the cam followers 169.

Since the cams 171 are mounted on the shaft 132 which carries the drum 131, it can be seen that for every rotation of the drum 131 the transfer gripper bar will be moved from the paper gripping position shown in FIGURE 12 to the paper releasing position and then returned to the paper gripping position.

Means is provided for actuating the grippers in the paper engaging and paper releasnig positions. In the paper engaging position, such means consists of a gripper actuator rod 176 carried by a pair of arms 177 fixed to a rocker shaft 178 rotatably mounted in the side frame members 36 and 37. The shaft 178 is adapted to be rocked by a solenoid SO-2 whose plunger 179 is pivotally connected to a rocker arm 180. The rocker arm 181 is fixed to the rocker shaft 178. When the SO-2 is energized, the outer end of the rocker arm 181 is lifted to move the gripper actuator 176 downwardly and to thereby depress the grippers 154 to provide a space between the toes 154b of the grippers and the gripper bar in which a sheet of paper can be received from the feed mouth 126. As soon as the solenoid SO-2 is deenergized, the gripper actuator rod 176 is returned to its normal position by action of a spring 181 and the grippers are returned to their normal upward positions by the springs 156 to firmly grip the sheets of paper.

Thereafter as hereinafter described, the sheets of paper are transferred rearwardly so that they can be impaled by the sheet impaling pins 142 after which the sheets are released by the grippers as the grippers come into engagement with conventional roller bearings 182 mounted on a rod 183 fixed to the side frame members 36 and 37. Thus, as can be seen particularly from FIGURE 12, as the transfer gripper bar is moved rearwardly, the grippers come into engagement with the roller bearings 182 to again move the grippers downwardly with respect to the gripper bar and to thereby release the sheet of paper carried thereby.

As the sheet of paper is transferred to the pickup drum and after passing the glue applicator mechanism 29, a microswtich MS-3 having an operating arm 184 is actuated for a purpose hereinafter described.

*Glue Applicator Mechanism*

The glue applicator mechanism 29 is shown particularly in FIGURE 12 and consists of a trough 191 extending laterally of the machine and disposed immediately below and behind the feed mouth 126 and in front of the drum 131. It will be noted that the glue applicator mechanism is spaced circumferentially from and above the carbon sheet pickup and feeding mechanism 31. The trough 191 is supplied with glue in a conventional manner which, as shown, consists of an entrance pipe 192 upon which is mounted a container 193 provided with a spout 194.

A bar 196 carried by substantially vertical rods 197 is normally disposed within the glue in the trough 191. The bar 196 carries two rows of glue applicator members or elements 198 in the form of vertical coil springs which are of such a length that when the bar 196 is in its lowermost position, the springs are completely submerged.

The rods 197 are secured to horizontally and diagonally extending members 201 and fixed to the upper ends of vertically reciprocal rods 202 disposed outside the side frame members 36 and 37. The rods 202 are carried by guides 203 and have their low ends pivotally connected to links 204 which are also pivotally connected to cam follower arms 206. The cam follower arms are pivotally mounted on the side frame members 36 and 37 by pins 207 and are provided with cam followers 208 which are adapted to engage cams 209 carried by opposite ends of the shaft 132. Spring means is provided for yieldably urging the cam followers into engagement with the cams 209 and consists of springs 211 mounted on a rod 212. The rod 212 is slidably mounted in a spring stop 213 and has a head member 214 at its upper end which engages a bearing 215 mounted on the cam follower arm 206. Thus, it can be seen that as the shaft 132 is rotated, the glue applicator bar 196 and the glue applying elements 198 carried thereby will be raised and lowered into and out of the glue in the trough 191 to apply glue to the sheets of paper in a manner hereinafter described.

Means is provided for preventing operation of the glue applicator means and consists of a solenoid SO-7 mounted on the side frame member 37 and having its plunger 218 pivotally connected to a latch 219 pivotally mounted on the side frame member 37 at 221. The latch is adapted to engage a detent 222 provided on the cam follower 206 and when so engaged prevents the spring 211 from raising the glue applicator bar as the cams 209 rotate.

*Carbon Table Assembly and Lift Mechanism Therefor*

As pointed out previously, the carbon table assembly and lift mechanism 30 is disposed below the glue applicator mechanism and consists of a substantially horizontal movable carbon table 226 disposed in front of the pickup drum 131. The carbon table is provided with slide bearings 227 on its opposite sides which are slidably mounted on guide rods 228. Springs 229 are provided on the lower ends of the guide rods to support the weight of the carbon table 226 and facilitate vertical movement of the carbon table on the guide rods 228.

The carbon table is provided with right and left hand side guides 231 adjustable transversely of the table by the use of knobs 232 threaded onto bolts 233 mounted in slots 234 extending transversely of the carbon table. Similarly, a movable rear guide 236 is provided which is also adjustable longitudinally of the table by the knobs 237 threadedly mounted on the bolts 238 mounted in slots 239 extending longitudinally of the table.

Vertical front guide members 241 are disposed in front of the carbon lift table and are carried by a horizontal member 242. The horizontal member 242 is mounted on a horizontal bar 243 secured to the frame of the machine by means of bolts 244 and is adjustable thereby with respect to the bar 243 away from and towards the carbon lift table. The upper end of each of the front guide members 241 is provided with a U shaped cutout 246 over which is mounted a spring member 247 to facilitate separation of the carbons as hereinafter described. Also mounted on the front guide members 241 to facilitate separation of the carbons is a pipe 248 supported by brackets 249 secured to the guide members. The pipe is provided with a plurality of orifices 251 which direct jets of air outwardly and upwardly from the pipe. A nozzle 252 is mounted on the rear end of the carbon lift table and directs a jet of air towards the rear of the carbons to also facilitate the separation of the carbons as hereinafter described.

Means is provided for raising and lowering the carbon lift table and consists of chains 256 which have their ends secured to bars 257 fixed to the carbon lift table. The chains pass over upper and lower sprocket wheels 258 and 259 rotatably mounted on the side frame members 36 and 37. The upper sprocket wheels 258 are fixed to a shaft 261 rotatably mounted in the side frame members. A spur gear 262 is mounted on the shaft 261 and is driven by a pinion gear 263. The pinion gear is mounted on a shaft (not shown) and is fixed to a ratchet wheel 264 and a hand wheel 266 to rotate therewith. A pawl 267 for advancing the ratchet wheel 264 is pivotally mounted on a member 268 pivotally mounted on the side frame member 36 at 269. A spring 271 is provided for yieldably urging the pawl into engagement with the ratchet wheel. The member 268 is adapted to be actuated to cause the pawl to advance the ratchet wheel a step at a time by a solenoid SO-3 having its plunger 272 pivotally connected to a link 273 that is pivotally connected to the member 268. A pawl 274 is pivotally mounted on a strap 275 and serves to prevent backward movement of the ratchet wheel 264. Both of the pawls 267 and 274 are adapted to be moved out of engagement with the ratchet wheel 264 by a hand operated lever 276 pivotally connected to the shaft 261 and which carries pins 277 and 278 which are adapted to engage the pawls. When the lever arm 276 is moved downwardly about the pivot point provided by the shaft 261, the pawls are moved out of engagement with the ratchet wheel so that the table can be raised and lowered manually by the hand wheel 266.

It is apparent that when the hand lever 276 is in a released position, the ratchet wheel will be advanced a step at a time each time the solenoid SO-3 is energized. Each time the ratchet wheel is advanced, the carbon lift table will be raised a predetermined amount, the distance being determined by the gear ratios, etc.

*Carbon Sheet Pickup and Feeding Mechanism*

The carbon sheet pickup and feeding mechanism 31 consists of a carbon lift bar 281 extending laterally of the machine. The carbon lift bar is provided with a passage 282 which extends longitudinally of the bar and opens into a plurality of ports or orifices 283 spaced longitudinally of the bar and opening into the bottom surface of the bar. Individual orifices are adapted to be closed off by needle-like valves 284 threaded into the bar and adapted to seat in the bar to prevent air to be drawn into the orifices 283. The carbon lift bar is connected to a source of vacuum as hereinafter described.

The opposite ends of the carbon lift bar 281 are fixed to arms 286, the lower ends of which are provided with cam followers 287 that are adapted to ride in cam tracks 288 provided in the side frame members 36 and 37. The other end of the arms are pivotally connected to crank arms 289 fixed to a rocking shaft 291. Additional crank arms 292 are fixed to the rocking shaft 291 outside the side frame members 36 and 37 and are pivotally connected to links 293 that are pivotally connected to cam follower arms 294. The cam follower arms 294 are pivotally mounted on the side frame members 36 and 37 by pins 168 and have cam followers 296 which by means of springs 298 are urged into engagement with cams 297 mounted on the shaft 132. The springs 298 are mounted on rods 299 which are pivotally connected to the cam follower arms 294 at 301 and which extend through spring stops 302.

The carbon lift bar 281 is movable between the carbon pickup positions and carbon release or feed positions and moves in a manner determined by the cam tracks 288.

Figure 3:
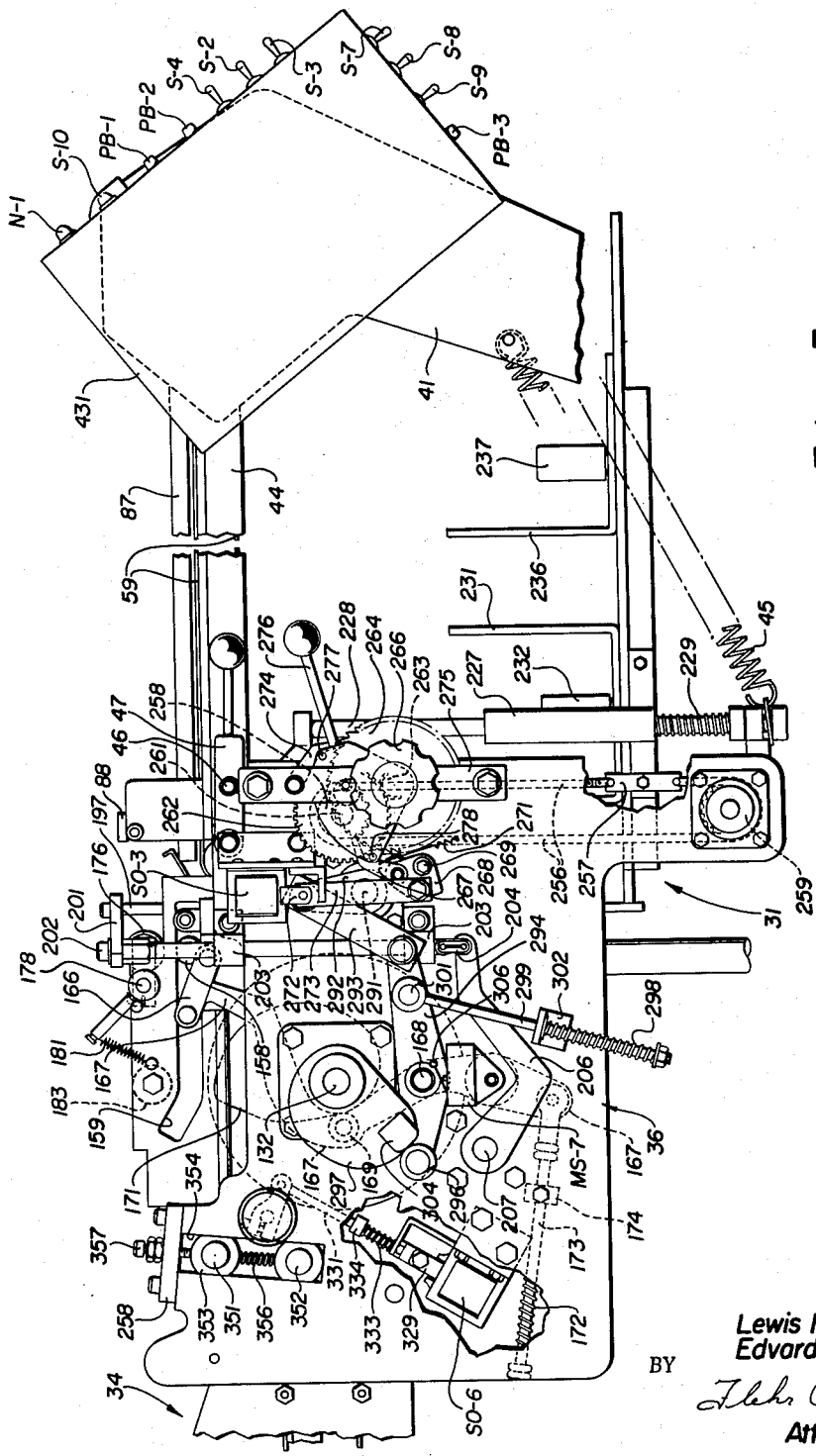
FIGURE 3 is a partial enlarged side elevational view of the near side of the machine as shown in FIGURE 1 with the protective cover removed and with certain parts broken away.

The cam 297 on the near side of the machine as viewed in FIGURE 3 carries an abutment 304 which is adapted to engage the operating arm 306 of a microswitch MS-7 for a purpose hereinafter described.

A carbon hold down plate 308 is provided adjacent the drum 131 and immediately above the carbon release position of the carbon pickup and feed mechanism to press the sheets of carbon as they are released onto the pickup pins. The carbon hold down plate 308 is provided with slots (not shown) to permit the passage of the pins 142.

The system for supplying the vacuum to the carbon lift bar consists of a motor M-2 which drives a vacuum pump 311. A fan 312 protected by a shroud 313 is provided for cooling of the pump. The exhaust side of the pump 311 is connected to a filter 314. As is well known to those skilled in the art, such a pump exhausts air under positive pressure which in the present machine is utilized for supplying air under pressure to the nozzle 252 and to the pipe 248 by hoses 316 and 317. The vacuum side of the pump is also connected to a filter 318. The filter 318 is connected to a pressure sensitive switch S-6, to a relief valve 319 and to a solenoid operated valve 321. The solenoid operated valve is connected to the vacuum bar 281 by a hose 322.

*Stripping Mechanism*

The stripping mechanism 32 consists of a stripper bar rockably mounted in the side frame members 36 and 37 to the rear of the drum 131 at a point substantially above the midpoint of the drum. A plurality of fingers 327 are mounted in spaced pairs on the stripper bar 326. The fingers 327 are mounted in such a manner that they are aligned with the grooves 133 in the drum 131. The fingers as shown in FIGURE 5 extend forwardly and upwardly from the bar 326 and normally have their forward ends spaced from the drum a suitable distance to permit passage of sheets accumulated by the drum. The forward ends of the fingers 327 are tapered downwardly and inwardly to facilitate close contact with the drum when they are moved into engagement with the drum.

Means is provided for rocking the bar 326 and the fingers carried thereby to move the fingers 327 into engagement with the drum. It consists of a solenoid SO-6 mounted on the side frame member 36 and which has its plunger 329 pivotally connected to an operating rod 331. The operating rod is pivotally connected to a crank arm 332 fixed to the stripper bar 326. A spring 333 mounted on the operating rod 331 and held in place by a stop 334 and a bracket 336 serves to yieldably urge the stripping fingers into a normal out-of-the-way position. It is readily apparent that when the solenoid SO-6 is energized, the stripping fingers will be moved into engagement with the drum to remove accumulated sheets of paper or completed forms from the drum.

Hold down means is mounted above the stripping mechanism 32 adjacent the drum 132. It consists of a bar 338 fixed between a pair of hold down arms 339 pivotally mounted on a pivot rod 341 mounted in the side frame members 36 and 38. A plurality of spaced hold down channels 342 are mounted longitudinally of the bar 338 and as shown in FIGURE 12, are inclined upwardly in the forward direction so that the space between the channel and the drum 131 gradually decreases toward the rear. The spaced channels 342 make it possible for the protruding needles 142 to pass the channels without difficulty.

A plurality of hold down rollers 343 of suitable material such as rubber are rotatably mounted on a rod 344 carried by end members 346 pivotally connected to the hold down arms 339. The rollers 343 are positioned so that they ride on the raised portions of the drum rather than in the grooves 133. The vertical position of the rollers 343 relative to the hold down arms is adjustable by means of the adjusting screws 347 provided in the hold down arms and engaging the end members 346.

Additional screws 348 are provided in the arms 339 to fasten the arms 339 to a bar 349 fixed to the side frame members 36 and 37. When it is desired to move the hold down means to an out-of-the-way position, it is merely necessary to unscrew the screws 348 and swing the hold down means about the pivot rod 341 to an out-of-the-way position. The hold down means serve to press the sheets of paper picked up by the needles 142 down onto the needles and onto the drum so that they cannot accidentally be stripped from the drum by the stripping mechanism when the stripping mechanism is in its normal out-of-the-way position.

*Trimming, Slitting and Perforating Mechanism*

The trimming, slitting and perforating mechanism 33 is located to the rear of the drum 132 immediately behind the stripping mechanism 32. It is very similar to apparatus described in our copending application Serial No. 554,891 filed December 22, 1955. In general, such a mechanism consists of a pair of shafts 351 and 352 which are rotatably mounted in bearing members 353 having flat sides as shown (FIGURE 3) and slidably mounted in rectangular open ended slots 354 provided in the side frame members 36 and 37. Springs 356 are disposed between the bearing members as shown. The bearings are held in place by screws 357 threaded into bars 358 removably mounted across the top of the slots 354.

On the lowermost shaft 352 are mounted a plurality of steel rollers 359 whereas on the upper shaft 351 are mounted a plurality of rollers 361 having an outer covering 362 of suitable material such as rubber. With such rollers mounted on the shafts 351 and 352, the rollers merely serve to engage the sheets or forms as they are stripped from the drum 132 and feed them to the delivery mechanism 34. However, as described in the above copending application, various types of knives may be mounted on the shafts 351 and 352 so that the accumulated sheets or forms when stripped from the drum 132 are trimmed, slitted and perforated as desired.

Both of the shafts 351 and 352 are driven by a chain 364 which is driven by a sprocket (not shown) connected to the shaft 138. The chain passes between and drives sprockets 366 and 367 mounted on the shafts 351 and 352 respectively. The chain also passes over an idler sprocket 368 mounted on a pivoted lever arm 369 which serves to maintain the chain 364 in a relatively taut condition through action of a spring 371 connected to the idler sprocket. A handle 372 for releasing the tension on the chain is connected to the lever arm 369.

When the accumulated sheets or forms have pased through the trimming, slitting and perforating mechanism 33, they pass onto a delivery mechanism 34.

*Delivery Mechanism*

The delivery mechanism 34 consists of a pair of said members 376 which are secured to the rear ends of the side frame members 36 and 37. A pair of guide rollers 377 and 378 are rotatably supported between the side members 376 and carry a belt 379 which travels between the side members 376. A belt tightener 381 is provided and consists of lever arms 382 pivoted on a rod 383 fixed to the side members 376. A roller 384 is rotatably mounted on the free ends of the lever arms 382 and rests on the belt as shown particularly in FIGURE 9 to maintain the belt 379 in a relatively taut condition so that it can be driven by the roller 378.

The roller 378 is mounted on a shaft 386 which is rotatably carried by the side member 376 as hereinbefore described. A hand wheel 387 is mounted on shaft 386 so that the belt 379 can be advanced by hand if desired.

Means is provided for automatically periodically advancing the belt and consists of a ratchet wheel 388 fixed to the shaft 386. The ratchet wheel 388 is adapted to be engaged by a pawl 389 pivotally mounted on a supporting member 391 by a pin 392. The pawl 389 is adapted to be moved into engagement with the ratchet wheel 388 by a solenoid SO-7 which has its plunger 393 pivotally connected to a link 394 that is pivotally connected to the pawl 389. The pawl 389 is yieldably held out of engagement with the ratchet wheel by a spring 396 secured between the supporting member 391 and the outer edge of the pawl 389.

The supporting member 391 carries the solenoid SO-7 and is rockably mounted on the shaft 386. The lower end of the supporting member 391 is pivotally connected to a connecting bar 397 which has its other end pivotally connected to a block 398 mounted on the end of the transfer gripper return spring rod 173. Thus, each time the transfer gripper mechanism is operated, the bar 397 will be reciprocated to rock the supporting member 391 and the solenoid SO-7 carried thereby. Thus, if the solenoid SO-7 is energized it will cause advancement of the ratchet wheel.

A delivery tray 401 is disposed at the outer rear end of the side members 376 and is pivotally connected thereto by pins 402. The angle of inclination of the tray 401 with respect to the delivery belt 379 is adjustable by means of threaded knobs 403 mounted in arcuate slots 404 in the side members 376. The knobs are adapted to releasably engage the side members to secure the tray at a desired angle.

Dolly assemblies 406 are disposed above the delivery belt 379 and ride on the delivery belt to facilitate the transfer of sheets and forms by the delivery belt to the delivery tray 401. Each of the dolly assemblies consists of a pair of wheels 407 of suitable material such as Micarta rotatably mounted on a shaft 408 carried by a mounting block 409. The wheels 407 are maintained in a spaced relationship by sleeves 411 mounted on the shaft and cotter pins 412 extending through the shaft.

Means is provided to facilitate lateral and longitudinal movement of the dollies with respect to the belt 379 and consists of a U-shaped rod 416 having one leg 417 substantially longer than the other leg 418. The leg 417 is slidably mounted in the block 409 and is provided with rubber grommets 419 which frictionally engage the leg but which permit the mounting block 409 to be shifted longitudinally along the leg 417 of the U-shaped member 416. The leg 418 is similarly slidably mounted in a mounting block 421 and is retained therein by grommets 422. The block 421 is also slidably mounted for lateral movement on a rod 423 supported by the side members 366. A thumb screw 424 is threadedly mounted in the block 421 to fix the position of the block with respect to the rod 423.

*Control System*

Figure 15:
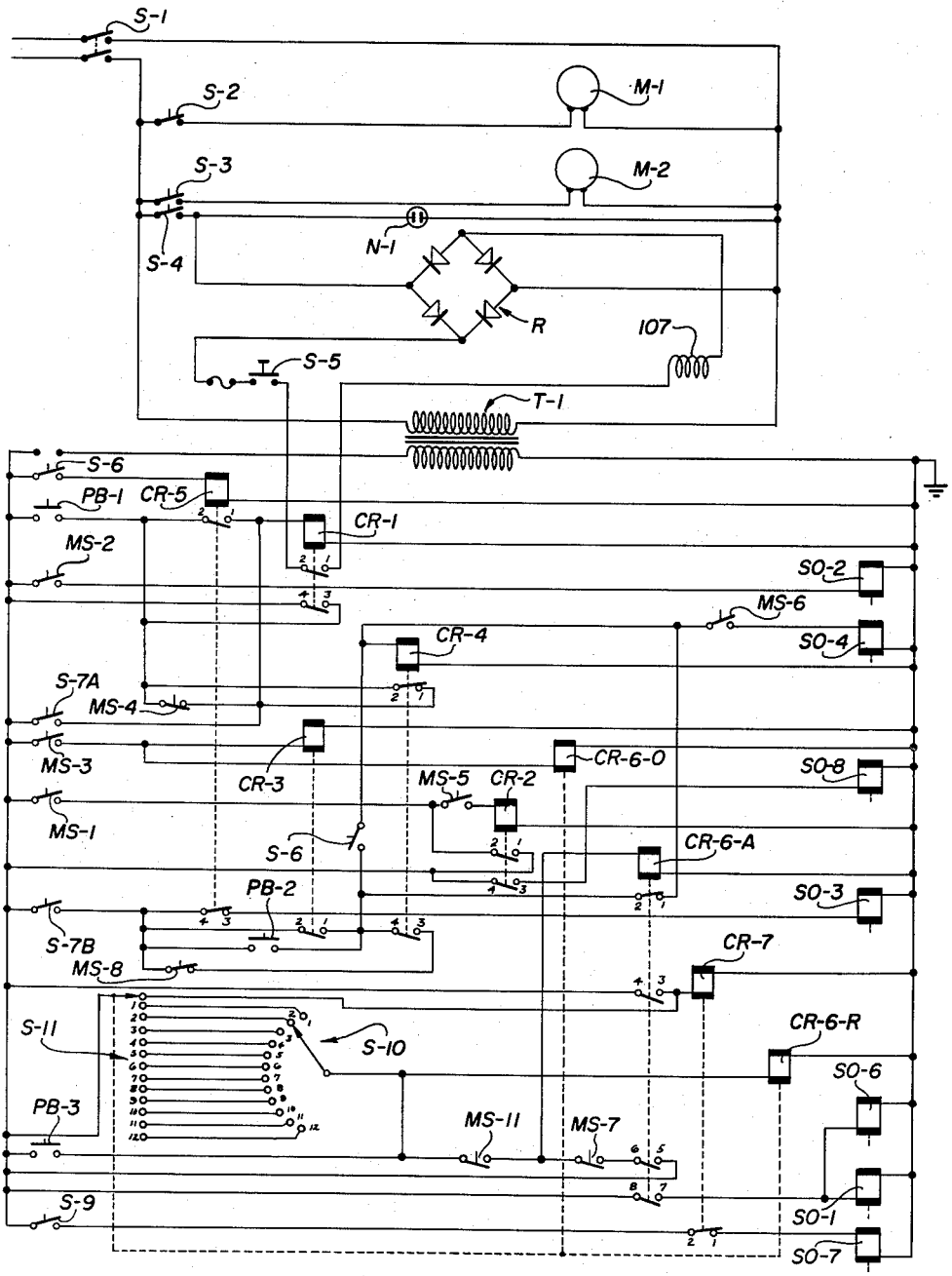
FIGURE 15 is a circuit diagram of the electrical system of the machine with certain parts schematically illustrated.

The control system is shown in the circuit diagram in FIGURE 15 in which certain components have been schematically illustrated. The neon lamp N-1, the selector switch S-10, the push buttons PB-1, PB-2 and PB-3, the switches S-2, S-3, S-4, S-7, S-8 and S-9 are mounted in a control box 431 which is mounted on one of the side members 41. Certain other components of the control circuitry are also mounted within the control box 431 such as the stepping switch S-11.

The control circuitry also includes certain solenoids which have been previously mentioned and which may be described as follows: They are the delivery belt solenoid SO-1, the gripper actuator solenoid SO-2, the carbon lift solenoid SO-3, the vacuum valve solenoid SO-4, the stripping mechanism solenoid SO-6, the glue applicator solenoid SO-7 and the feed gate solenoid SO-8.

The circuitry also includes microswitches MS-2, MS-4, MS-6, MS-8 and MS-11, the function of which will be hereinafter described, which are mounted on a circular plate 434 fixed to the side frame member 37 and which are adapted to be actuated by a plurality of cams 435, 436, 437, and 438 mounted on the main sprocket wheel 134 to rotate therewith. Switch MS-6 is adapted to be operated by cam 435, switch MS-8 by cam 436, switch MS-1 by cam 437 and switches MS-11, MS-2 and MS-4 by cam 438. The circuitry also includes microswitches MS-3, MS-5 and MS-7 hereinbefore described.

The circuitry in addition, includes a suitable source of power such as 110 v. 60 cycle A.C. designated by terminals L-1 and L-2, a main switch S-1, a transformer T-1, a full wave rectifier R and a plurality of relays CR-1, CR-2, CR-3, CR-4, CR-5 and CR-6A. Each of these relays is provided with two or more contacts which are numbered as indicated on the circuit diagram. The circuit diagram also includes a step coil CR-6O and a return coil CR-6R for the stepping switch S-11. All of these components except the coils CR-6O and CR-6R which are mounted on control box 431 are mounted in a cabinet 451 mounted on the base of the machine.

Also included in the circuitry is a foot operated switch S-5.

*Summary of Operation*

The operation of the machine may now be briefly described as follows. Let it be assumed that it is desired to assemble a multi-part business form such as a three-part form which consists of three sheets of paper and two sheets of carbon interleaved between the three sheets of paper. Piles of each type of paper making up a part of the form are placed in sequence on collating trays 452 of the type shown in copending application Serial No. 553,952, filed December 19, 1955, now Patent No. 2,914,-189. A pile 461 of carbon sheets is placed on the carbon table and the rear guides 236 and the side guides 231 are properly adjusted to properly position the sheets.

The machine is first turned on by operating the toggle switch S-2 to start the drive motor M-1 in operation. Toggle switch S-3 is also operated to start the vacuum pump M-2 since carbons are desired. The toggle switch S-4 on the control box 431 is operated to energize the control circuit to supply control voltage to the solenoids, microswitches and relays. The transformer T-1 reduces the voltage from 110 to 24 volts, and the rectifier R supplies 90 volts D.-C.

The selector switch S-10 is set for the number of parts comprising the form to be completed by the machine. Since we have assumed that a three-part form is to be produced by the machine, the selector switch S-10 is set at the number 3. The numbers on this switch indicate the number of sheets of paper comprising the form exclusive of the carbons. The toggle switch S-7 is switched to the carbon position which closes the contacts S-7A.

The feed belts 59 are now placed in operation. To do this, it is necessary to energize the electric clutch 107 by energization of the relay CR-1. Relay CR-1 is operated by closing the reset push button PB-1. The relay CR-1, upon momentary closing of the reset push button PB-1, is energized through the normally closed microswitch MS-4, or through the normally closed contacts of relay CR-4. The energization of the relay CR-1 closes its normally open contacts 1 and 2, and 3 and 4. Contacts 1 and 2 apply the 24 volts D.-C. to the electric clutch 107 each time the foot switch S-5 is operated. Contacts 3 and 4 of relay CR-1 establish a holding circuit for the relay CR-1 through the normally closed microswitch MS-4 and the contacts 1 and 2 of the relay CR-4 so that the push button PB-1 may be released after a momentary closure.

Thus, as soon as feed belts 59 are operated by closing the foot switch S-5, a sheet of paper may be dropped into the feed hopper.

Now, commencing with the bottom sheet of the form, one sheet 462 is removed from one of the collating trays 452 by the operator and dropped into the feed hopper 48 in which the left-hand guide 54 has been set so that the distance between the right-hand guide 53 and the guide 54 is the same as the width of the sheet. The sheet 462 is dropped between the guides and slides downwardly because of gravity onto the belts 59, whereupon the lower and forward edge is carried forwardly under the feed rollers 69 and the shoes 71 until the forward edge is in engagement with the foot-like members 81 of the feed gate 78.

When a sheet of paper moves into engagement with the feed gate, it engages the operating arm 102 and causes operation of the microswitch MS-5. Microswitch MS-5 is normally open and actually serves as a detector or feeler. It is connected in series with microswitch MS-1 which is one of the microswitches carried by the plate 434. Thus, when a sheet of paper has closed switch MS-5, at a predetermined point in time, microswitch MS-1 will be actuated to energize the feed gate relay CR-2 which energizes the feed gate solenoid SO-8. As hereinbefore described, operation of the solenoid SO-8 causes the feed gate 78 to be rocked in a counter-clockwise direction as viewed in FIGURE 5 to release the sheet which is held thereby. As soon as the gate is opened, the feed gate bar 79 applies additional pressure to the leaf springs 86 carried by the feed rollers 69 so that the sheet of paper immediately underneath is positively driven by the feed belts 59 to provide an immediate getaway for the sheet of paper. As pointed out previously, it is important that the sheet of paper be advanced immediately as soon as the feed gate is opened to ensure its proper arrival at the gripper mechanism.

It has been found that since the weight of the sheet of paper is essentially governed by its thickness, the pressure that is exerted on the sheets by the feed rollers because of the action of the bar 79 upon the leaf springs 86 is such that it will increase as the thickness of the paper increases, and for that reason a single setting of the feed rollers by the thumb screws 74 will normally accommodate sheets of paper which are of different weights and thicknesses.

The microswitch MS-1 is operated by the cam 435 for a very short period of time as for example, 10° of a cycle, so that it controls the precise time the feed gate opens regardless of when a sheet of paper is dropped into the feed hopper. As pointed out above, the feed gate is only operated when both switches MS-1 and MS-5 are closed. The solenoid SO-8 is energized as soon as the contacts 3 and 4 of relay CR-2 are closed. As soon as relay CR-2 is energized, its contacts 1 and 2 are closed to establish a holding circuit for the relay through microswitch MS-5. Thus, the relay CR-2 will be maintained in energized condition even though microswitch MS-1 is opened and will remain energized until the sheet of paper has completely passed microswitch MS-5 to release the microswitch. As soon as the sheet of paper has passed the feed gate, the relay CR-2 will be de-energized as will be the solenoid SO-8. The feed gate is immediately returned to a closed position by action of the spring 85.

As soon as the feed gate is closed, the operator may drop another sheet into the feed hopper. It is, therefore, apparent that the operator need not precisely time the dropping of the sheets into the feed hopper but need only take care to drop a sheet when the gate is closed. It is also apparent that if no sheet is present at the time that the microswitch MS-1 is operated, the feed gate will not be opened because microswitch MS-5 will not be closed.

As the sheet of paper is advanced after it has passed the feed gate, the sheet of paper is maintained in engagement with the right hand guide means 93 by action of the inclined belts 59. It is positively driven forward at the same speed as the belts are moving by the action of the balls 98 in the cage 99. The right-hand edge of the sheet is prevented from riding up into the guide means by the spring strip 96.

As pointed out previously, the transparent feed table is provided with metallic strips grounded to the frame for dissipating any static electricity which may be collected by the sheet of paper.

Thus, as the sheet is driven positively by the feed belts, it is held in proper alignment by the right-hand guide means 53 so that the leading or front edge of the sheet of paper enters the feed mouth 126 in proper registration to permit the leading or front edge to be grasped by the gripper transfer mechanism 29.

At this point in time, the transfer gripper mechanism is adjacent the feed mouth as shown in FIGURE 12. In this position, the grippers are actuated by the rod 176 to open the grippers 54. The gripper actuator rod has been lowered by energization of the solenoid SO-2 which is energized by closing of microswitch MS-2 carried by the plate 434. The switch MS-2 is operated so that the gripper actuator rod 173 opens the grippers at the time the transfer gripper mechanism is in its return or paper gripping position adjacent the feed mouth so that it can receive the sheet of paper delivered into the feed mouth by the feed belts.

As soon as the sheet of paper has been delivered into position between the gripper bar 153 and the toes 154b of the grippers, the solenoid SO-2 is de-energized by opening of the switch MS-2. The gripper actuator rod 176 is returned to its normal position by spring 181 to thereby permit the grippers to be urged upwardly by their springs 56 to firmly engage the leading edge of the sheet of paper.

During this time, the cams 171 which are a part of the gripper transfer mechanism, are positioned so that the cam followers 169 engage the at rest portions of the cams 171. This continues through the portions of the cycle shown in FIGURES 17 and 18. However, when the cams 171 move towards the position shown in FIGURE 19, the sleeve bearings 163 are accelerated rapidly to the right carrying with them the transfer gripper bar, and the sheet of paper carried thereby. As the sheet of paper 462 is delivered by the gripper transfer mechanism tangentially of the drum 131, the sheet of paper and the transfer gripper mechanism is accelerated so that at the time the sheet of paper reaches the drum, the sheet of paper is travelling at the same speed as the drum. At this point, the sheet of paper is transferred from the transfer gripper mechanism to the drum.

Figure 17:
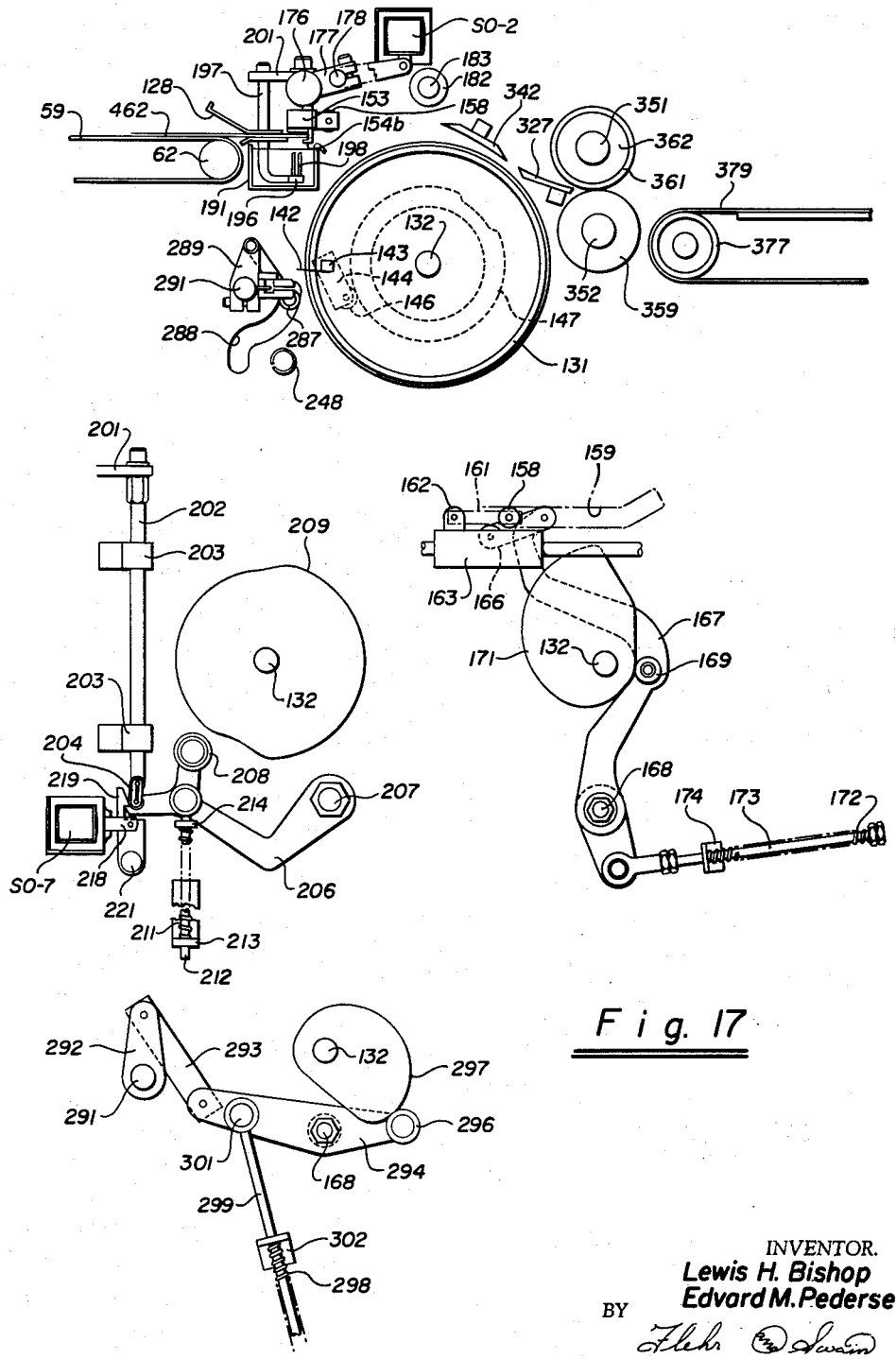

It will be noted from FIGURES 17, 18, and 19 that the needles or pins 142 carried by the pin bar 143 are approaching the upper part of the drum so that they can pick up the sheet of paper which is being delivered by the transfer gripper mechanism. The needles are held in an extended position by the cam follower 156 which engages the cam 147 carried by the drum. As the drum rotates to carry the needles 142 to their uppermost position, to what may be termed the pick-up station, the forward margin of the sheet of the paper carried by the gripper transfer mechanism is impaled upon the pins 142.

At this pick-up or transfer station, the grippers are depressed by the roll bearings 182 to cause the grippers to release the sheet of paper 462 carried thereby. As soon as the grippers roll onto the roller bearings 182 to cause release of the sheet of paper, the gripper bar and the grippers carried thereby are moved at a speed greater than the speed of the rotating drum so that they will clear the sheet which has been transferred to the drum. At the same time, the gripper bar and the grippers carried thereby are moved upwardly and away from the drum due to the action of the rollers 158 engaging the upwardly inclined portions of the slots 159, as shown in FIGURE 20. Thereafter, the sheet of paper impaled upon the pins 142, moves under the deflector or hold-down channels 342 which force the sheet of paper against the surface of the drum.

When the sheet of paper is moved from the feed mouth to the pick-up position, a microswitch MS-3 is actuated as shown in FIGURE 19. Closing of the switch MS-3 causes energization of the feeler relay CR-3. Energization of relay CR-3 causes closing of its normally open CR-3 causes energization of the vacuum relay CR-4 contacts 1 and 2. Closing of contacts 1 and 2 of relay CR-3 causes energization of the vacuum relay CR-4 through the closed carbon switch contacts S-7B, contacts 1 and 2 of relay CR-3, and contacts 1 and 2 of counting relay CR-6A. It should be pointed out that microswitch MS-3 is only closed for a short period of time depending upon the length of the paper being fed through the machine. Energization of the relay CR-4 closes its normally open contacts 1 and 2 to establish a holding circuit for relay CR-3 through normally closed microswitch MS-8.

At the same time that microswitch MS-3 is closed, the step coil CR-60 is energized to advance the step switch S-11 from the zero terminal to the number 1 terminal.

It should be pointed out that when the stepping relay S-11 is in the zero position, the no glue relay CR-7 is energized. The contacts 1 and 2 of relay CR-7 are normally closed and, therefore, when the relay is energized, the solenoid SO-7 cannot be energized and, therefore, the glue latch 219 is engaged as is shown in FIGURES 17 and 18. However, as soon as the stepping relay S-11 is moved from the zero position to the number 1 position, relay CR-7 is de-energized closing its normally closed contacts 1 and 2 to permit energization of the glue latch solenoid SO-7 when the glue on and off switch S-9 is closed. When a three-part form is being prepared by the machine, the switch S-9 is closed and, therefore, when microswitch MS-3 is operated, the solenoid SO-7 is energized and the glue latch 219 is moved to a retracted position as shown in FIGURE 19.

At approximately this time, the microswitch MS-4 carried by the switch plate 434 is actuated by cam 438 driven by the shaft 132. Microswitch MS-4 is normally closed. Operation of the microswitch serves to place the feed belt relay CR-1 under the control of relay CR-5.

During the time the sheet of paper is being transferred to the drum, the carbon sheet pick-up mechanism 31 is being moved so that the vacuum or carbon pick-up bar 281 is moved downwardly until it comes into engagement with the pile 461 of carbon sheets. At this time, the microswitch MS-6 carried by the switch plate 434 is actuated by the cam 435 driven by the shaft 132. Closing of normally open microswitch MS-6 causes energization of the vacuum solenoid SO-4 which causes a vacuum to be applied to the piping 322 and to the vacuum bar 281 so that air is drawn through the orifices 283. Microswitch MS-6 is kept in an operative condition by the cam from the time that the vacuum bar drops down onto the carbon pile until the sheet of carbon is transferred to the pins of the cylinder. The vacuum is normally maintained at a predetermined level such as 10 inches of mercury by the vacuum relief valve 319.

The switch S-6 is a conventional bellows operated vacuum switch which remains closed above a certain predetermined set value, as for example, above seven inches of mercury. The switch S-6 is set to operate within a predetermined range of five to seven inches of mercury. Thus, when the vacuum in the system drops below five inches of mercury which normally would occur only if one of the ports or orifices 283 is open, the vacuum switch S-6 is operated to de-energize relay CR-5 to open its normally open contacts 1 and 2 and to close its normally closed contacts 3 and 4. Thus, if for some reason a carbon is not picked up by the vacuum bar, the switch S-6 will be operated and the relay CR-5 will be de-energized. This could occur if the carbon pile 461 is not high enough for the vacuum bar to grasp one of the carbons. When this occurs, the solenoid SO-3 is energized by closing of the contacts 3 and 4 of the relay CR-5. Energization of the solenoid SO-3 causes advancement of the ratchet wheel 264 one step to thereby raise the carbon lift table one increment. Normally, the carbon lift table is positioned manually by use of the knob 266 before starting the machine so that the pile of carbon sheets is in the approximate desired position.

During this period of time, when the relay CR-5 is normally operated, the microswitch MS-4 carried by the switch plate 434 is actuated to place the belt relay under control of relay CR-5. Thus, when the relay CR-5 is de-energized by opening of the switch S-6, the belt relay CR-1 is also de-energized because the contacts 1 and 2 of vacuum relay CR-4 are also open. This stops the feed belts on the feed table to prevent any additional sheets of paper to be delivered to the drum.

The carbon pick-up and feed mechanism goes through the same cycle of operation until a carbon has been picked up, that is, the relay CR-5 is de-energized in each cycle until a carbon is picked up and the carbon lift solenoid SO-3 is energized each time the relay CR-5 is energized to continue raising the carbon lift table until a carbon is picked up by the vacuum bar.

As soon as a carbon is picked up by the vacuum bar, all of the ports or orifices in the vacuum bar will be closed by the sheet of carbon except those outside of the sheet of carbon which already have been closed by turning those screws 264 down into the ports.

Figure 22:
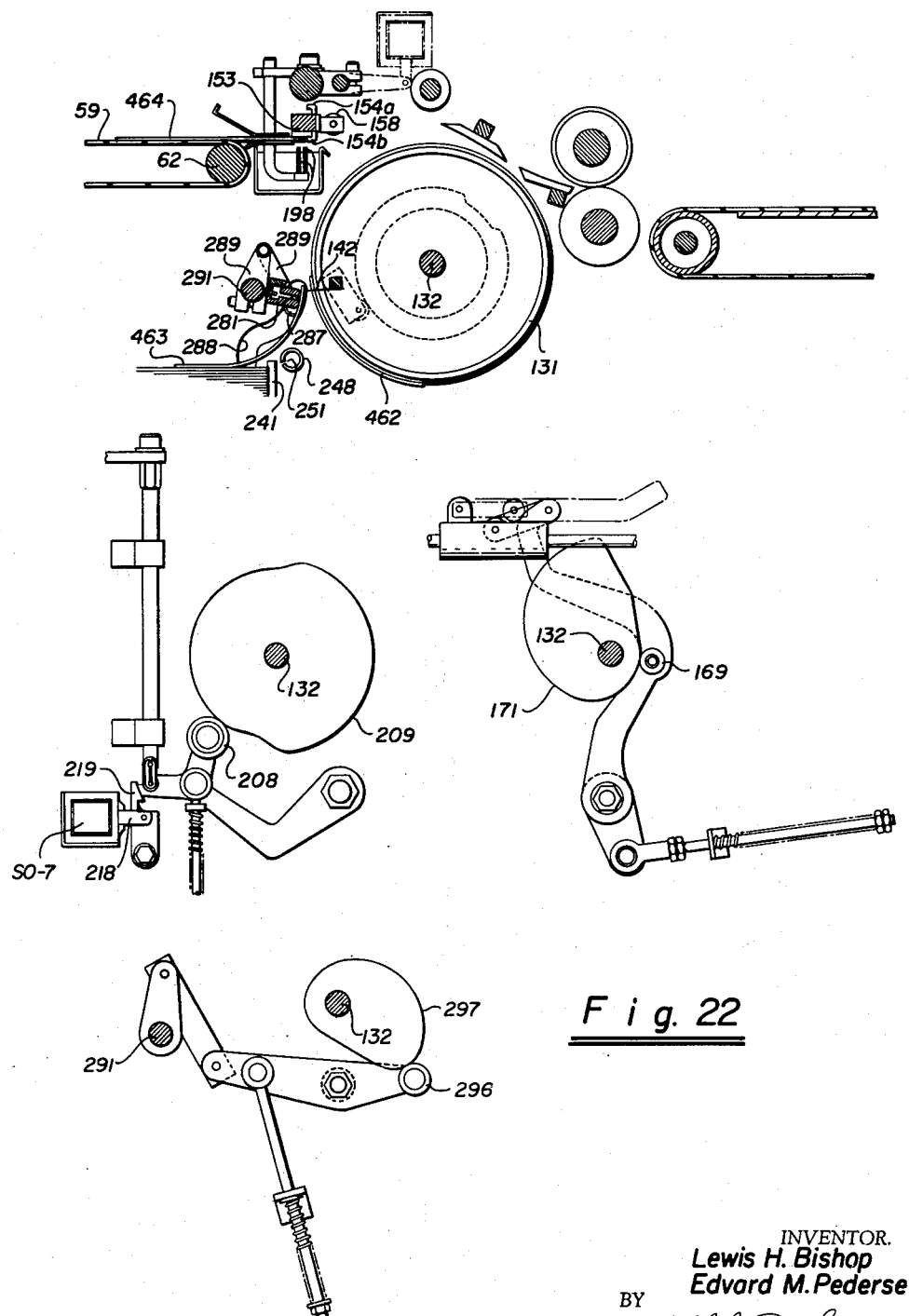

The picking up of a sheet of carbon by the vacuum bar is illustrated in FIGURES 21 and 22. It will be noted that while this is occurring, the gripper transfer mechanism is moving to its return position adjacent the feed mouth. Also, while this is occurring, the next sheet of paper is being released by the feed gate.

It will be noted that the vacuum lift bar 281 is initially lifted upwardly in a substantially vertical direction as shown particularly in FIGURE 19. This is to be sure that the sheet of carbon clears the front guide members 241, and also to ensure that the front edge of the carbon sheet wipes past the springs 247 and also to permit the jets of air being exhausted through the ports 251 to blow past the carbon to ensure that only one sheet of carbon is lifted by the vacuum lift bar. The springs 247 separate any sheets of carbon which tend to be carried with the uppermost sheet on the carbon pile when it is lifted away from the carbon pile by the vacuum lift bar. The nozzle 252 provided at the rear of the pile continuously blows a jet of air into the top of the pile of carbon sheets to provide a small quantity of air between the top carbon sheets so that the carbons can be easily separated and so that only one sheet of carbon will be lifted each time a vacuum condition is applied to the vacuum lift bar.

As soon as the sheet of carbon has been grasped by the vacuum lift bar and separated from the other sheets in the pile, the sheet of carbon is rapidly moved to the carbon feeding station relative to the drum as shown in FIGURE 22 in a path determined by the cam tracks 288, and at a speed determined by the cams 297.

During this time, the drum has been rotating, carrying with it the pin bar 143 and its pins 142 and the sheet of paper 462 carried thereby. The sheet 463 of carbon is impaled on the pins 142 at the carbon pick-up station as the sheet of carbon is delivered by the vacuum bar. It will be noted that again the forward or leading edge of the sheet of carbon is impaled by the pins 142. However, as shown in FIGURE 22, the sheet of carbon is staggered rearwardly from the front edge of the sheet of paper 462 a predetermined distance for a purpose hereinafter described.

At the time the carbon sheet 463 is delivered to the carbon pick-up station and the sheet is impaled by the pins 142, the vacuum on the vacuum bar is released by de-energization of the solenoid SO-4. Solenoid SO-4 is de-energized by opening of cam operated switch MS-6 as hereinbefore described. Within a short time after switch MS-6 is opened, microswitch MS-8 carried by the switch plate 434 is opened to break the holding circuit for the vacuum relay CR-4. Microswitch MS-8 has been placed in the circuit to prevent more than one sheet of carbon for each sheet of paper placed on the drum in the event the operator fails to follow the cycle of the machine and happens to miss placing a sheet of paper in the hopper.

If for any reason, a carbon sheet is not picked up by the carbon sheet pickup mechanism, the recarbon pushbutton PB-2 can be operated to cause a recycling of the operation of the carbon sheet pickup mechanism by causing energization of relay CR-4.

Figure 23:
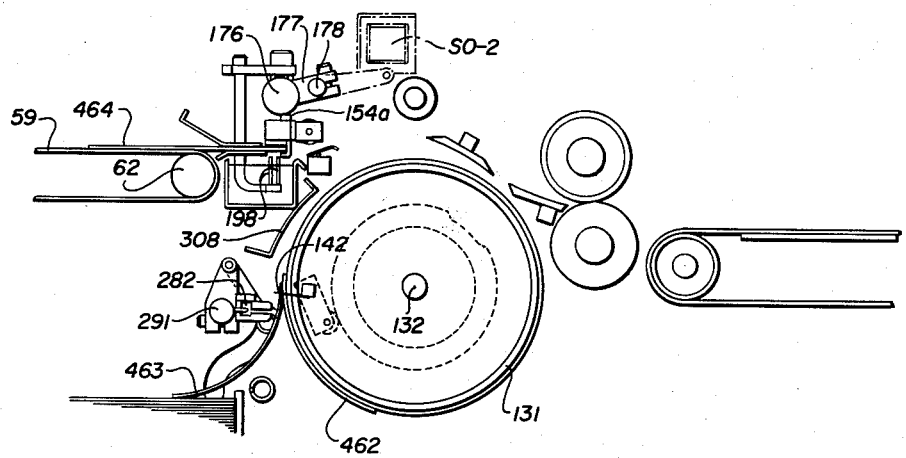
Figure 24:
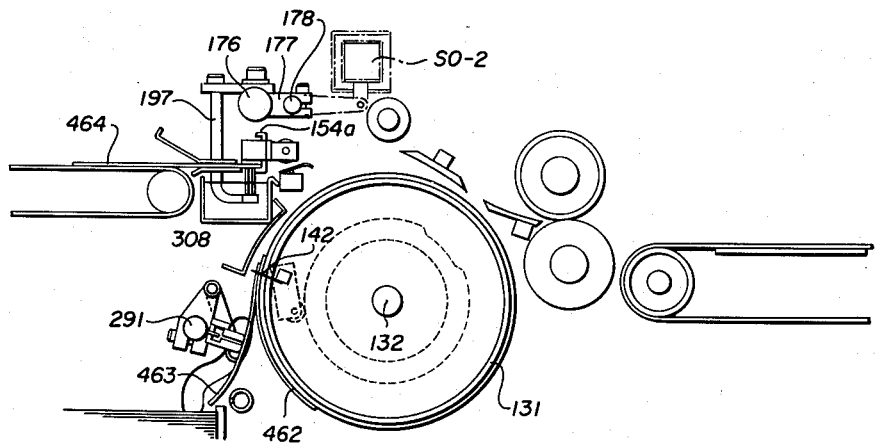
Figure 25:
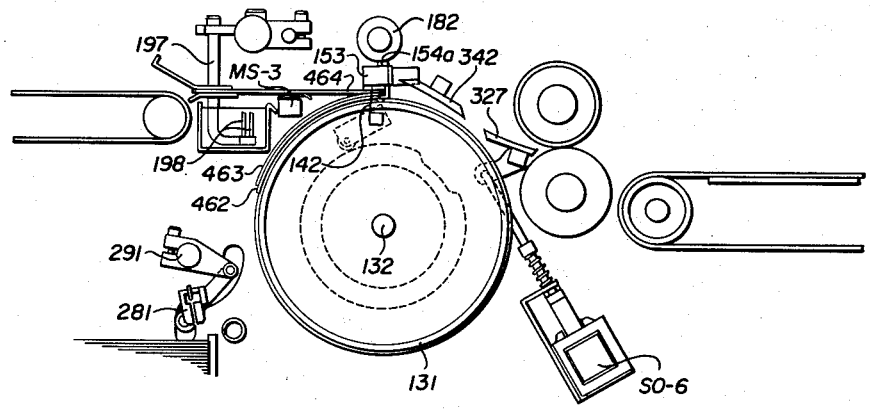

After the sheet of carbon has been impaled on the pins 142, the drum continues to rotate and the carbon sheet comes in contact with the carbon hold-down or deflector plate 303 which pushes the carbon onto the pins and against the drum as shown in FIGURES 23 and 24. While this is occurring, the second paper sheet 464 of the form is being advanced to the feed mouth and into the transfer gripper mechanism.

Also, at the same time, the glue bar 196 carrying the springs 198 is being raised out of the glue trough 191 by action of the spring 211 urging the rod 202 upwardly as permitted by the cams 209. The cams 209 are shaped so that the glue bar 196 and the springs 198 pause momentarily so that excess glue can drain from the springs before they move upwardly into engagement with the paper sheet. After remaining in this drain position for a short period of time, the glue bar 196 moves upwardly until the tops of the springs 198 engage the bottom side of the forward edge of the paper sheet 464 to deposit thereon two spaced rows of glue dots positioned in a particular manner. At the same time, the second paper sheet 464 is gripped by the transfer gripper mechanism and transferred to the sheet pick-up station so that its forward margin is picked up by the pins 142 in a manner similar to that hereinbefore described for sheet 462. One row of the glue dots on the sheet 464 contacts the first paper sheet 462, whereas the second row of glue dots on the sheet 464 contacts the carbon sheet 463. Thus, it can be seen that the second sheet of paper and the carbon sheet are glued to the first sheet of paper by one application of glue to the underside of the sheet 464. This operation can be continued as long as desired to make up a form of as many parts as required. Each time the drum makes a rotation, it will first pick up a carbon at the carbon pick-up station and then another sheet of paper at the paper pick-up station to which two rows of glue dots have been applied.

When the second sheet of paper 464 is transferred by the gripper mechanism to the paper pick-up station, the microswitch MS-3 is actuated again to energize relay CR-3 and the step coil CR-60. Energization of the step coil advances the step switch S-11 to terminal number two.

It will be noted that the glue bar 196 and the springs 198 carried thereby after applying glue dots to a sheet of paper, are immediately returned into a position where they are submerged in the glue in the glue trough. In this way, the glue cannot harden on the glue applicator springs 198 and the springs always have glue thereon ready for the next glue application. Any dripping from the springs and glue bar 196 will drip down into the trough 191. There is no opportunity for glue to drip onto the carbon sheets or the sheets of paper.

When the second carbon sheet and the third paper sheet are collected by the drum, MS-3 is again actuated to energize relay CR-3 and step coil CR-60. Since selector switch S-10 has been set on terminal three, the return coil CR-6R for the step switch S-11 is energized. Although the return coil CR-6R for the stepping relay S-11 has been energized, the stepping relay will not be returned to the home position until the sheet of paper 464 has completely passed the microswitch MS-3 and releases the operating arm for the microswitch.

After the return coil CR-6R for the relay S-11 has been energized, the microswitch MS-11 carried by the switch plate 434 is actuated to close its circuits for the energization of the counting relay CR-6A through the selector switch S-10 and the stepping switch S-11. Closing of contacts 5 and 6 of relay CR-6A establish a holding circuit for the relay through the normally closed microswitch MS-7. Closing of normally open contacts 3 and 4 of relay CR-6A causes energization of the no glue relay CR-7 to open its normally closed contacts 1 and 2 to de-energize the solenoid SO-7 and to allow the glue latch 219 to engage the cam follower arm 206. This prevents the application of glue to the underside of the first sheet of paper which makes up the next form being made up by the machine.

Figure 26:
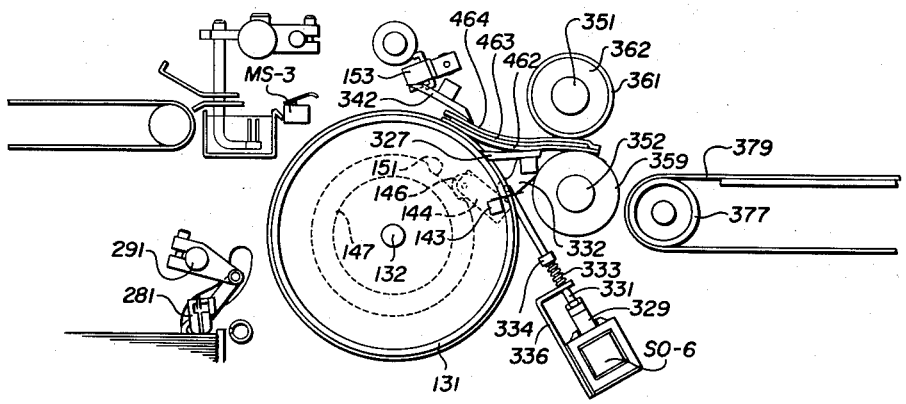

Closing of normally open contacts 7 and 8 of relay CR-6A energizes solenoids SO-1 and SO-6. Energization of the solenoid SO-6 causes the stripping fingers 327 to be moved into engagement with the drum. At approximately the same time, the cam followers 146 drop into the recesses 151 provided in the stationary cams 147 to permit the bar 143 and the pins 142 carried thereby to be tilted counter-clockwise as viewed in FIGURE 26 to facilitate stripping of the completed form from the pins. As the completed form is stripped from the drum, it is delivered to the trimming, slitting and perforating mechanism 33 which, as shown, includes rollers 359 and 361 which deliver the completed form to the delivery belt 379.

The belt 379 is periodically advanced by the transfer gripper mechanism which moves the energized solenoid SO-1 to advance the belt 379 as hereinbefore described. Thus, each time a form is delivered to the belt, the belt is advanced an increment to space the forms on the belt. It has been found that this spacing facilitates drying of the glue on the forms. The completed forms are delivered by the belt 379 to the delivery tray 401 where they may be periodically picked up by the operator of the machine.

The holding circuit for the relay CR-6A is broken by operation of the normally closed microswitch MS-7. As pointed out previously, the microswitch MS-7 is operated by an abutment 304 carried by the cam 297. The operation of the microswitch MS-7 is timed so that the stripper mechanism will not be released until a sheet of maximum length has been stripped from the drum. As soon as the microswitch MS-7 is operated, relay CR-6A is de-energized which causes de-energization of the solenoids SO-1 and SO-6. The stepping switch S-11 by this time, has already been returned to the zero position by the return coil CR-6R at the time the microswitch MS-3 is released by the last sheet of paper.

The machine is now in position to prepare another form identical to that heretofore produced by the machine.

*No Carbon Operation*

Now let it be assumed that it is desired to complete a form in which no carbons are to be utilized. The switch S-7 is operated to close the no carbon contacts S-7A. Since the contacts S-7B remain open, it is impossible for the solenoids SO-3 and SO-4 to be energized, and for that reason no carbon sheets are picked up by the carbon lift mechanism.

The switch contacts S-7A serve to bypass the microswitch MS-4, and the control relay CR-5 which are associated with the vacuum checking mechanism hereinbefore described. Therefore, operation of the switch S-7 to close the contacts S-7A effectively bypasses all the contacts in the circuitry which control the de-energization of the feed belt relay CR-1.

*Carbon First Operation*

In the case where it is desired to produce a form consisting of one sheet of paper and one sheet of carbon, the selector switch S-10 is set at one and the front guides 241 for the carbon sheets are adjusted by means of the screws 244 so that the forward edge of the sheets of carbon are flush with the forward edge of the sheet of paper rather than being staggered as in the production of multiple part forms.

The carbon first switch S-8 is operated to move it to a closed position. Closing this switch bypasses the normally closed contacts 1 and 2 of relay CR-6A. The switch S-9 is also moved to a closed position to turn the glue on. Closing of this switch bypasses the normally closed contacts of the relay CR-7 so that the glue latch solenoid SO-7 will be energized continuously permitting the gluing mechanism to operate on every revolution of the drum.

To start such a form, the re-carbon push button PB-2 is depressed to place a sheet of carbon to the drum first. Depression of the re-carbon push button PB-2 causes energization of the relay CR-4 through the carbon contacts S-7B and the carbon first switch S-8. This causes a sequence of operation for a carbon sheet pick-up similar to that hereinbefore described so that a sheet of carbon is placed first on the drum rather than a sheet of paper.

Thereafter, a sheet of paper is fed into the hopper, carried to the gripper mechanism, glued by the glue mechanism, counted by the microswitch MS-3 and associated circuitry and attached to the sheet of carbon on the drum and then stripped from the drum in a manner similar to that hereinbefore described for the other forms. The operation differs, however, in that the carbon circuit is not turned off by operation of the relay CR-6A because its contacts 1 and 2 are bypassed by the carbon first switch S-8. Therefore, during the stripping operation, a single sheet of carbon is deposited on the drum or cylinder while awaiting the next sheet of paper to be delivered by the gripper mechanism and to be glued to it.

When the desired number of forms has been completed, the carbon switch S-7 is operated to open the contacts S-7B. The remaining carbon on the drum is stripped from the drum by operation of the cycle out push button PB-3 which causes operation of the return coil CR-6R and the relay CR-6A.

All of the forms with more than one part are completed in a manner similar to that first described, that is, with the sheet of paper first and the carbon following. Thus, when it is desired to place the machine in operation for the production of such forms, the switch S-8 must be opened as must switch S-9.

By way of example, it has been found that an operator with a commercial embodiment of the present machine, can with ease manufacture 1600 three-part forms with interleaved carbons in an hour—4800 single-part forms with carbons can be manufactured in an hour. Additional speed can be obtained by placing more than one form on a sheet.

It is apparent from the foregoing that we have provided a new and improved machine and method for collating, glue tipping and carbon interleaving. The feed gate mechanism operates to deliver sheets of paper in proper timing, with the rotation of the drum to prevent the machine from becoming fouled when the operator fails to follow the cycle of the machine. The sheets of paper are positively and instantly driven at the moment the feed gate is opened. The glue tipping is done in a particularly novel manner, that is, two rows of glue dots are applied to the underside of the second sheet of the form before the second sheet is delivered to the pick-up drum. The glue tips are applied in such a manner that at no time is any glue dropped on the sheets of paper or on the sheets of carbon. The glue mechanism is constructed in such a manner that the glue does not harden on the glue applicator members. Adequate provisions are made in the event a carbon is not picked up when desired. The carbon pile height is determined through the use of a vacuum switch rather than mechanical pile detectors.

At the same time, the machine is very versatile in that it can be used for making multiple part forms of any number of parts with sheets of carbon interleaved between them if desired. Multiple part forms can be produced by the machine with or without carbons. Single part forms with a carbon attached can also be produced by the machine without difficulty.

We claim:

1. In a machine of the character described, a rotatable one-piece drum, sheet feeding means for feeding sheets successively to the drum, means on the drum for picking up a succession of sheets from the feeding means so that the sheets are wrapped onto the drum and carried by the drum as it is rotated, glue containing means underlying the path of travel of the sheets to the drum, glue applying elements normally disposed below the glue in the glue containing means, means operating in a timed relationship with the rotation of the drum for raising the glue applying elements out of the glue and into engagement with the sheets before they are picked up by the drum to deposit glue on the underside of the sheets, and means for preventing the raising of said glue applying elements into engagement with the first sheet picked up by the drum.

2. In a machine of the character described, a rotatable one-piece drum, primary and secondary sheet feeding means to feed sheets to the drum at stations spaced circumferentially thereof, means on the drum for picking up a succession of sheets from the primary and secondary sheet feeding means so that the sheets are wrapped onto the drum and carried by the drum, glue applying means mounted between the drum and the primary sheet feeding means and below the path of travel of the sheets from the primary sheet feeding means to the pick-up station on the drum, means causing said glue applying means to apply glue to the underside of the sheets from the primary sheet feeding means before the sheets from the primary sheet feeding means are picked up by the drum, the glue applied to the sheets from the primary sheet feeding means serving to bind the sheets picked up by the drum from the primary and secondary sheet feeding means into a unitary assembly, and means selectively operated for preventing the application of glue by said glue applying means to the first sheet picked up by the drum to prevent the first sheet from adhering to the drum.

3. A machine as in claim 2 together with control means for causing the machine to pick up a sheet from the secondary sheet feeding means before a sheet is picked up from the primary sheet feeding means.

4. A machine as in claim 2 together with control means for causing the drum to first pick up a sheet from the primary sheet feeding means and thereafter a sheet from the secondary sheet feeding means for each sheet picked up from the primary sheet feeding means, the leading edges of the sheets from the secondary sheet feeding means being offset in a trailing direction from the leading edges of the sheets from the primary feed means.

5. In a machine of the character described, a rotatable drum, feed means for feeding a succession of sheets to the drum, pick-up means on the drum for picking up the sheets in succession from the feed means, said feed means including feed belt means for advancing the sheets of paper to the drum, a feed gate mounted on the feed belt means and movable between open and closed positions to control the movement of sheets by the feed belt means, and control means for controlling the operation of said feed gate, said control means including a switch operable by the sheet as it reaches the feed gate and is stopped by the feed gate, means including an additional switch connected in series with said first named switch to open the feed gate at a predetermined time interval in relation to the rotation of the drum to release the sheet and to permit the same to be carried by the feed belt means to the drum, said gate being closed when said first named switch is released by the end of said sheet.

6. A machine as in claim 5 together with feed rollers positioned ahead of the gate, and means operable by opening of said gate to urge said rollers into firm engagement with the sheet being held by the gate so that when the feed gate is opened, the sheet is immediately advanced by said feed belt means.

7. A machine as in claim 5 wherein said feed belt means includes a feed table, right-hand guide means carried by the feed table, feed belts moving over the table in a direction inclined toward the right-hand side of the table, said feed belt serving to urge the sheet carried thereby into engagement with the right-hand guide means, and strap-like means carried by said right-hand guide means and overlying the right-hand margin of the sheet to prevent the sheet from curling upwardly into the right-hand guide means.

8. A machine as in claim 7 together with hold-down members positioned above the feed table and the feed belt to prevent buckling of the sheets of paper as they are moved by the feed belt.

9. In a machine of the character described, a rotatable drum, gripping means, means for moving said gripping means between receiving, pick-up and out-of-the-way positions, said gripping means in the receiving position being substantially stationary, in the pick-up station moving at a rate of speed equal to the rate of speed of the drum, and in moving towards the out-of-the-way position moving at a speed substantially greater than the speed of the drum, sheet feeding means for feeding sheets to the gripping means, means for causing the gripping means to grasp the sheets as they are delivered at the receiving position, means on the drum for picking up the sheets as they are delivered by the gripping means to the pick-up station, means for causing the gripping means to release the sheets of paper carried thereby as the sheet is picked up by the drum, and means for moving said gripping means upwardly as it is moved to its out-of-the-way position away from the drum to permit the passage of the drum and the sheet carried thereby.

10. A machine as in claim 9 wherein said gripping means includes a gripper bar, a plurality of grippers slidably mounted on said gripper bar for movement in a direction at right angles to the longitudinal axis of the bar, said grippers having head and toe portions, springs mounted in the bar and engaging the head portion of the grippers to normally urge the toes of the grippers into engagement with the gripper bar.

11. In a machine of the character described, a rotatable drum, a feed mouth, feed belt means for delivering sheets in succession into said feed mouth, a gripper bar, a plurality of grippers slidably mounted on said gripper bar for movement at right angles to the longtiudinal axis of the gripper bar, said grippers being provided with head and toe portions overlying and underlying the bar respectively, springs mounted in the bar and engaging the head portions serving to normally urge the grippers upwardly to cause the toe portions to engage the bar, means for moving the gripper bar and the grippers carried thereby from a receiving position to a pick-up position and then to an out-of-the-way position, the sheets of paper being delivered by the feed belt means into the feed mouth and to the gripper bar when the gripper bar is in the receiving position, means for depressing the grippers on the gripper bar when the gripper bar is in the receiving position so that the leading edge of the sheet is urged between the toes of the grippers and the gripper bar, means for releasing the grippers carried by the gripper bar so that the sheet of paper is firmly held between the toe portions of the grippers and the gripper bar, the gripper bar and the grippers carried thereby serving to transfer the sheet from the feed mouth to the pick-up station, means on the drum for picking up the sheet carried by the gripper bar as the gripper bar moves through the pick-up position so that the sheet is wrapped on the drum and carried thereby, and means for depressing the grippers to release the sheet of paper as the sheet is picked up by the drum, the gripper bar thereafter rapidly moving to the out-of-the-way position to permit the passage of the drum and the sheet carried thereby.

12. A machine as in claim 11 together with glue applying means mounted adjacent the feed mouth and underlying the path of travel of the sheets from the feed mouth to the drum, and means for actuating said glue applying means to apply glue to the leading edge of the sheet as it is held by said gripper bar.

13. A machine as in claim 11 wherein said means mounted on said drum for picking up the sheets consists of a bar rockably mounted in said drum, a plurality of pins mounted on said bar and extending to slots formed in said drum, a stationary cam, and a cam follower connected to said pin bar and engaging said cam, the cam being provided with a recess, the cam follower when in engagement with said recess in the cam permitting said pins carried by the pin bar to be tilted in a trailing direction wtih respect to rotation of the drum and when out of engagement with said recess serving to maintain said pins inclined in a forward direction with respect to rotation of the drum to facilitate retention of the sheets on the drum, and stripping means engaging the drum and serving to remove the sheets carried thereby, said stripping means being operable when said cam follower is in engagement with said recess to thereby facilitate the removal of the sheets from the pins.

14. In a machine of the character described, a rotatable drum, a table mounted adjacent said drum and movable vertically with respect to said drum, a pile of sheets mounted on said table, a sheet lifting bar movable between a position overlying the pile of sheets and a position adjacent the drum, a plurality of orifices in one side of said sheet lifting bar, means for closing certain of said orifices in said bar so that only the orifices immediately overlying the pile of sheets are open, means for applying a vacuum to the bar during the time it is in a position overlying the pile of sheets and moving towards said drum, means on the drum for picking up the sheet as it is delivered by the pickup bar, means for sensing when the vacuum in said bar drops below a predetermined value, and means actuated by said last named means to raise said table and the pile of sheets carried thereby a predetermined amount.

15. A machine as in claim 14 wherein said means for applying a vacuum consists of a vacuum pump together with means connected to the exhaust side of the pump for supplying air under pressure to the pile of sheets in a direction generally parallel to the plane of the sheets to facilitate separation of the pile of sheets.

16. A machine as in claim 14 together with front guide means disposed adjacent the front of the table, said front guide means having spring-like members mounted thereon and positioned in such a manner that when the sheets are raised by the lift member, the front edges of the sheets are wiped across the spring members to thereby facilitate separation of the sheets so that only the uppermost sheet is picked up by the bar.

17. In a collating machine of the character described, a rotatable drum, sheet means for feeding sheets to the drum in succession, means mounted on the drum for picking up a succession of sheets from the feeding means, glue applying means to apply glue to the sheets before they are picked up by the drum, stripping means for periodically removing the accumulated sheets from the drum, and means for controlling the operation of said stripping means, said last named means including a selector switch movable to a position to indicate the number of sheets in the form, said selector switch having terminals engaged as the switch is moved, a stepping switch connected to the selector switch, counting means actuated each time a sheet is picked up by the drum to advance the stepping switch, and means for actuating said stripping means when said stepping switch reaches the terminal to which the selector switch is connected.

18. In a collating machine of the character described, a rotatable drum, primary and secondary sheet feeding means to feed sheets to the drum at stations spaced circumferentially thereof, means on the drum for picking up a succession of sheets from the primary and secondary sheet feeding means, glue applying means mounted adjacent the primary sheet feeding means to apply glue to the sheets from the primary sheet feeding means before they are picked up by the drum, counting means including a switch adjacent the primary sheet feeding means for counting the sheets picked up by the drum from the primary sheet feeding means, selector means for determining the number of sheets to be accumulated by the drum, said selector means including terminals engaged as the selector means is operated, a stepping switch connected to said selector means and to said counting means whereby each time said counting means is actuated said stepping switch is actuated, and stripping means engageable by the drum, and means actuated by the stepping switch for operating the stripping means when the stepping switch has been advanced to the terminal selected by the selector means.

19. In a machine of the character described, a rotatable one-piece drum, sheet feeding means for successively feeding sheets to the drum in a direction of travel which is at right angles to the axis of rotation of the drum, means on the drum for picking up a succession of sheets from the sheet feeding means so that the sheets are wrapped about the drum and carried by the drum, and glue applying means mounted to the rear of the drum and applying glue to the sheets along a line transverse of the direction of travel of the sheets before they are picked up by the drum.

20. In a machine of the character described, a rotatable one-piece drum, sheet feeding means for feeding sheets successively to the drum in a direction which is at right angles to the axis of rotation of the drum, means on the drum for picking up a succession of sheets from the sheet feeding means so that the sheets are wrapped on the drum and carried by the drum as it is rotated, and glue applying means underlying the path of travel of the sheets to the drum and extending transversely of the path of travel of the sheets to the drum, means for causing the glue applying means to apply glue to the sheets along a line which is parallel to the axis of rotation of the drum before the sheets are picked up by the drum.

21. A machine as in claim 20 wherein said sheet feeding means, the rotation of said drum and the glue applying means are operated in a timed relationship so that the glue is applied to the leading edges of the sheets.

22. In a machine of the character described, a rotatable one piece drum, sheet feeding means for feeding sheets to the drum successively, means on the drum for picking up a succession of sheets from the feeding means so that the sheets are wrapped onto the drum and are carried by the drum as it is rotated, and glue applying means mounted to the rear of the drum and applying glue to the sheets before they are picked up by the drum, said glue applying means including a glue trough underlying the path of travel of the sheets to the drum, glue applying elements normally disposed below the glue in the trough and means operating in a timed relationship with respect to rotation of said drum for raising said glue applying elements out of the glue and into engagement with sheets before they are picked up by the drum, said last named means being arranged so that the glue applying elements pause momentarily after they have been raised out of the glue in the trough to permit the excess glue to drain therefrom.

23. A machine as in claim 22 wherein said glue applying elements are coil springs and wherein the means for raising the glue applying elements includes means for returning the glue applying elements to a position below the surface of the glue immediately after engagement with the sheets.

References Cited in the file of this patent
UNITED STATES PATENTS

| 1,228,933 | Leilich et al. | June 5, 1917 |
| 1,339,467 | McConnell | May 11, 1920 |
| 1,452,888 | Marsh | Apr. 24, 1923 |
| 1,493,167 | Stevens | May 6, 1924 |
| 1,496,726 | Myhrum | June 3, 1924 |
| 2,017,459 | Howe et al. | Oct. 15, 1935 |
| 2,371,179 | Mendes | Mar. 13, 1945 |
| 2,384,021 | Federwitz | Sept. 4, 1945 |
| 2,640,695 | Nelson | June 2, 1953 |
| 2,721,737 | Hammer et al. | Oct. 25, 1955 |
| 2,902,278 | Bradshaw | Sept. 1, 1959 |